United States Patent
Kim et al.

(10) Patent No.: US 11,652,373 B2
(45) Date of Patent: May 16, 2023

(54) WIRELESS CHARGING METHOD AND APPARATUS THEREOF

(71) Applicant: Samsung Electronics Co., Ltd., Suwon-si (KR)

(72) Inventors: Kihyun Kim, Suwon-si (KR); Kyungha Koo, Seoul (KR); Wooram Lee, Hwaseong-si (KR); Changhyung Lee, Suwon-si (KR); Jihye Kim, Suwon-si (KR); Jihong Kim, Suwon-si (KR); Yunjeong Noh, Suwon-si (KR); Seho Park, Yongin-si (KR); Kumjong Sun, Suwon-si (KR); Ju-Hyang Lee, Suwon-si (KR); Mincheol Ha, Suwon-si (KR); Sangmoo Hwangbo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/688,269

(22) Filed: Mar. 7, 2022

(65) Prior Publication Data

US 2022/0190609 A1    Jun. 16, 2022

Related U.S. Application Data

(63) Continuation of application No. 16/880,260, filed on May 21, 2020, now Pat. No. 11,451,074, which is a (Continued)

(30) Foreign Application Priority Data

Aug. 13, 2015   (KR) .................. 10-2015-0114964

(51) Int. Cl.
*H02J 7/00*    (2006.01)
*H02J 50/80*   (2016.01)
(Continued)

(52) U.S. Cl.
CPC ............ *H02J 50/80* (2016.02); *H02J 7/0029* (2013.01); *H02J 7/0042* (2013.01);
(Continued)

(58) Field of Classification Search
CPC .......... H02J 50/005; H02J 50/10; H02J 50/80; H02J 7/00309; H02J 7/0042
(Continued)

(56) References Cited

U.S. PATENT DOCUMENTS 10,763,707 B2   9/2020  Lee et al.
2006/0103355 A1  5/2006  Patino et al.
(Continued)

FOREIGN PATENT DOCUMENTS

CN    102197566 A    9/2011
CN    102498634 A    6/2012
(Continued)

OTHER PUBLICATIONS

Chinese Office Action dated Apr. 8, 2022, issued in Chinese Application No. 202111329855.5.
(Continued)

*Primary Examiner* — Zixuan Zhou
(74) *Attorney, Agent, or Firm* — Jefferson IP Law, LLP

(57) ABSTRACT

An electronic device is provided. The electronic device includes a housing, a wireless charging coil disposed inside the housing, a fan disposed inside the housing and in proximity to the coil, a temperature sensor disposed inside the housing and in proximity to the coil, a wireless charging circuit having the coil and configured to transmit power wirelessly to an external device via the coil, and a control circuit electrically connected to the fan, the temperature sensor, and the wireless charging circuit. The control circuit may be configured to receive a signal from the external device, receive data related to a temperature of the coil from
(Continued)

the temperature sensor, and control the fan at least partially on the basis of at least one of the signal and the data.

24 Claims, 22 Drawing Sheets

Related U.S. Application Data continuation of application No. 16/371,690, filed on Apr. 1, 2019, now Pat. No. 10,938,239, which is a continuation of application No. 15/202,171, filed on Jul. 5, 2016, now Pat. No. 10,270,276.

(51) Int. Cl.
*H02J 50/00* (2016.01)
*H02J 50/10* (2016.01)

(52) U.S. Cl.
CPC ........ *H02J 7/00309* (2020.01); *H02J 50/005* (2020.01); *H02J 50/10* (2016.02)

(58) Field of Classification Search
USPC .......................................... 320/108; 307/104
See application file for complete search history.

(56) References Cited

U.S. PATENT DOCUMENTS

| | | | |
|---|---|---|---|
| 2008/0079388 A1 | 4/2008 | Sarnowsky et al. | |
| 2009/0021212 A1 | 1/2009 | Hasegawa et al. | |
| 2012/0001496 A1 | 1/2012 | Yamamoto et al. | |
| 2012/0112553 A1 | 5/2012 | Stoner, Jr. et al. | |
| 2012/0223590 A1 | 9/2012 | Low et al. | |
| 2012/0242285 A1 | 9/2012 | Jung et al. | |
| 2013/0031377 A1 | 1/2013 | Sultenfuss et al. | |
| 2013/0086401 A1* | 4/2013 | Thomas ................ | G06F 1/3237 713/322 |
| 2013/0106348 A1 | 5/2013 | Jung | |
| 2014/0007594 A1 | 1/2014 | Lofy et al. | |
| 2014/0062392 A1 | 3/2014 | Lofy et al. | |
| 2014/0070763 A1 | 3/2014 | Chiles et al. | |
| 2014/0113689 A1 | 4/2014 | Lee | |
| 2014/0246901 A1* | 9/2014 | Ichikawa ................ | B60L 1/003 307/104 |
| 2016/0141884 A1 | 5/2016 | Lee et al. | |
| 2016/0181849 A1* | 6/2016 | Govindaraj ....... | H02J 7/007192 320/108 |

FOREIGN PATENT DOCUMENTS

| | | |
|---|---|---|
| CN | 102570128 A | 7/2012 |
| CN | 102593957 A | 7/2012 |
| CN | 102694423 A | 9/2012 |
| CN | 103094991 A | 5/2013 |
| CN | 204012862 U | 12/2014 |
| CN | 104471834 A | 3/2015 |
| CN | 104539005 A | 4/2015 |
| CN | 204376492 U | 6/2015 |
| CN | 114123428 A | 3/2022 |
| EP | 2 503 663 A1 | 9/2012 |
| EP | 2 590 293 A1 | 5/2013 |
| JP | S63100518 A | 5/1988 |
| JP | 2006/129605 A | 5/2006 |
| JP | 2011125184 A | 6/2011 |
| JP | 2013135572 A | 7/2013 |
| JP | 2013-150393 | 8/2013 |
| JP | 2013201852 A | 10/2013 |
| JP | 2014018002 A | 1/2014 |
| KR | 10-2007-0080057 A | 8/2007 |
| KR | 10-2014-0065090 A | 5/2014 |
| KR | 10-2014-0077801 A1 | 6/2014 |
| KR | 10-2015-0003553 A | 1/2015 |
| KR | 10-2015-0021318 A | 3/2015 |
| KR | 10-2015-0028131 A | 3/2015 |
| KR | 10-2016-0057247 A | 5/2016 |
| KR | 10-2016-0105014 A | 9/2016 |
| WO | 2008044875 A1 | 4/2008 |
| WO | 2010/026805 A1 | 3/2010 |
| WO | 2017/026800 A1 | 2/2017 |

OTHER PUBLICATIONS

Chinese Office Action dated Apr. 19, 2022, issued in Chinese Application No. 202111487520.6.
Extended European Search Report dated May 27, 2022, issued in European Application No. 22158359.4.
Extended European Search Report dated May 24, 2022, issued in European Application No. 16835330.8.
Indian Office Action dated Sep. 30, 2019, issued in Indian Patent Application No. 201737045766.
Korean Notice of Patent Grant dated Jan. 27, 2021, issued in Korean Application No. 10-2015-0114964.
Chinese Office Action dated Apr. 14, 2021, issued in Chinese Patent Application No. 201680047116.8.
European Office Action dated Jun. 24, 2021, issued in European Patent Application No. 20 184 680.5.
European Search Report dated Aug. 31, 2020, issued in European Application No. 20184680.5.
Chinese Office Action dated Aug. 24, 2020, issued in Chinese Application No. 201680047116.8.
Korean Office Action dated Sep. 1, 2020, issued in Korean Application No. 10-2015-0114964.
European Search Report dated Oct. 13, 2020, issued in European Application No. 16835330.8.
U.S. Office Action dated Aug. 6, 2020, issued in related U.S. Appl. No. 16/371,690.
Chinese Office Action dated Jul. 6, 2022, issued in Chinese Application No. 202111487520.6.
Chinese Office Action dated Jul. 26, 2022, issued in Chinese Application No. 202111329855.5.
Chinese Office Action dated Aug. 4, 2022, issued in Chinese Application No. 202111502466.8.
Reject Decision dated Sep. 19, 2022, issued in Chinese Application No. 202111487520.6.
Rejection Decision dated Sep. 23, 2022, issued in Chinese Application No. 202111329855.5.
Chinese Office Action dated Oct. 17, 2022, issued in Chinese Application No. 202111502466.8.
Chinese Office Action dated Jan. 10, 2023, issued in Chinese Application No. 202111502466.8.

* cited by examiner

WIRELESS CHARGING METHOD AND APPARATUS THEREOF

CROSS-REFERENCE TO RELATED APPLICATION(S)

This application is a continuation application of prior application Ser. No. 16/880,260, filed on May 21, 2020, which is a continuation application of prior application Ser. No. 16/371,690, filed on Apr. 1, 2019, which is a continuation application of prior application Ser. No. 15/202,171, filed on Jul. 5, 2016, which has issued as U.S. Pat. No. 10,270,276 on Apr. 23, 2019 which was based on and claimed the priority under 35 U.S.C. § 119(a) of a Korean patent application number 10-2015-0114964, filed on Aug. 13, 2015 in the Korean Intellectual Property Office, the disclosure of which is incorporated by reference herein in its entirety.

TECHNICAL FIELD

The present disclosure relates to a method and apparatus for wireless charging of an electronic device.

BACKGROUND

A wireless charging device (system) can deliver energy wirelessly to a load without a transmission line by converting electric energy to electromagnetic waves.

A magnetic induction scheme as one of wireless charging schemes uses a magnetic field induced from a coil to deliver power, and can provide energy to a load in such a manner that induction current is allowed to flow in a reception coil by using a magnetic field generated from current that flows in a transmission coil. A standard of the magnetic induction scheme includes wireless power consortium (WPC), power matters alliance (PMA), or the like. A power transmission frequency may use 110-205 kHz in case of the WPC, and may use 227-357 kHz and 118-153 kHz in case of the PMA.

Charging power of the wireless charging system is variable depending on a load condition and charging current which are set in the system, whereas charging voltage can be used statically. With the quick charging and high-power wireless charging in the wireless charging system, heat generation is increased, which may cause a usage restriction.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless charging method and apparatus capable of decreasing heat generation when high-power and quick wireless charging is performed.

Another aspect of the present disclosure is to provide a wireless charging method and apparatus capable of effectively cooling heat generated during a charging operation, by using an air circulation generation member (e.g., a fan).

Another aspect of the present disclosure is to provide a method and apparatus capable of cooling a heat generator by observing a heating temperature in high-power charging and by driving a fan when the heating temperature exceeds a threshold.

In accordance with an aspect of the present disclosure, an electronic device is provided. The electronic device includes a housing, a wireless charging coil disposed inside the housing, a fan disposed inside the housing and in proximity to the coil, a temperature sensor disposed inside the housing and in proximity to the coil, a wireless charging circuit having the coil and configured to transmit power wirelessly to an external device via the coil, and a control circuit electrically connected to the fan, the temperature sensor, and the wireless charging circuit.

The control circuit may be configured to receive a signal from the external device, receive data related to a temperature of the coil from the temperature sensor, and control the fan at least partially on the basis of the signal and/or the data.

In accordance with another aspect of the present disclosure, an electronic device is provided. The electronic device includes a housing, a wireless charging coil disposed inside the housing, a fan disposed inside the housing and in proximity to the coil, a temperature sensor disposed inside the housing and in proximity to the coil, and a wireless charging circuit having the coil and configured to transmit power wirelessly to an external device via the coil.

The electronic device may perform an operation comprising receiving a signal from the external device, receiving data related to a temperature of the coil from the temperature sensor, and controlling the fan at least partially on the basis of the signal and/or the data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
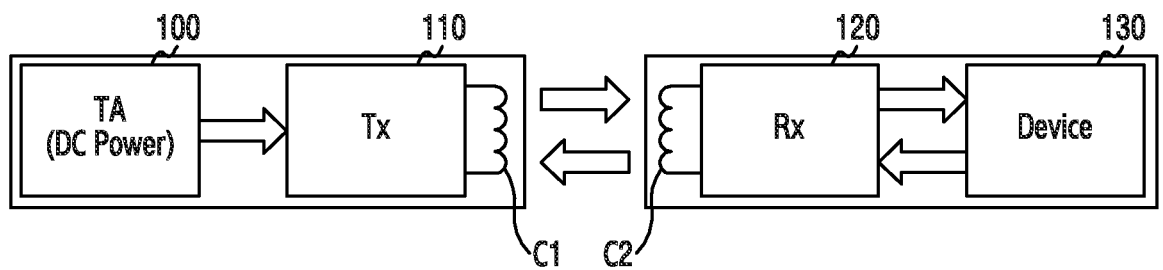
FIG. 1 illustrates a general structure of a wireless power transmission system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in various embodiments of the present disclosure, the expressions "include," "may include" and other conjugates refer to the existence of a corresponding disclosed function, operation, or constituent element, and do not limit one or more additional functions, operations, or constituent elements. Further, as used in various embodiments of the present disclosure, the terms "include," "have," and their conjugates are intended merely to denote a certain feature, numeral, operation, element, component, or a combination thereof, and should not be construed to initially exclude the existence of or a possibility of addition of one or more other features, numerals, operations, elements, components, or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

Furthermore, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG_2) audio layer 3 (MP3) player, a mobile medical appliance, a camera, and a wearable device (e.g. a head-mounted-device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. For example, the smart home appliance may include at least one of a television (TV), a digital versatile disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

In the following description, first voltage may be used as a term including basic charging voltage transmitted wirelessly by an electronic device to an external device in a basic charging mode. Second voltage may be used as a term including high-power charging voltage transmitted wirelessly by the electronic device to the external device in a high-power charging mode. A first mode may be used as a term including the basic charging mode. A second mode may be used as a term including the high-power charging mode. An external power source may be used as a term including a charger (e.g., a travel adapter).

Hereinafter, a configuration of a wireless charging device will be described according to various embodiments with reference to the accompanying drawings.

FIG. 1 illustrates a general structure of a wireless power transmission system according to an embodiment of the present disclosure.

Referring to FIG. 1, the wireless power transmission system is generally constructed of a travel adapter (TA) 100 for supplying a power source by converting alternating current (AC) power to a direct current (DC) power source, a wireless charging transmitter (TX) 110 for receiving the DC power source, converting it to the AC power, and transmitting the power through a transmission coil C1, a wireless charging receiver (RX) 120 for receiving the AC power transmitted from the transmission coil C1 through a reception coil C2, converting it to DC power, and creating a DC power source having a constant amplitude, and an external device 130 for receiving the rectified DC power source from the RX 120. In the wireless power transmission system, the TA 100 and the wireless charging TX 110 may be electrically connected, and the external device 130 may include the wireless charging RX 120.

Figure 2:
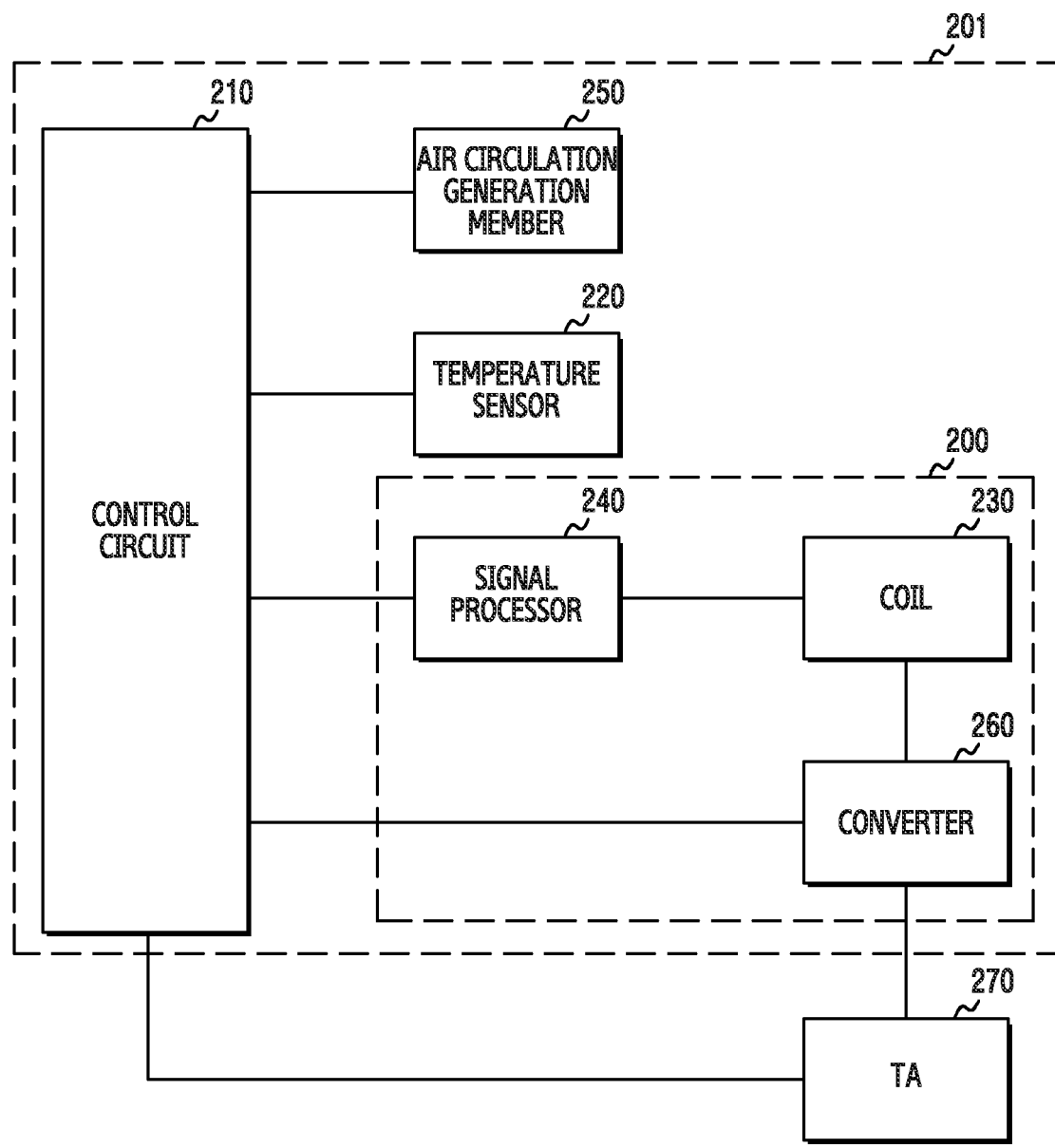
FIG. 2 illustrates a configuration of an external power source supply device according to various embodiments of the present disclosure.

FIG. 2 illustrates a configuration of an electronic device according to various embodiments of the present disclosure.

Referring to FIG. 2, an electronic device 201 may be a wireless charging device. An external device (or an external electronic device) according to various embodiments of the present disclosure may be a device to which a charging power source is supplied by the electronic device.

The electronic device according to various embodiments of the present disclosure may include a wireless charging circuit 200, a control circuit 210, a temperature sensor 220, an air circulation generation member 250, or the like. The wireless charging circuit may include a coil 230, a signal processor 240, and a converter 260. The electronic device may be electrically connected to a TA 270. For example, the converter of the electronic device and the TA 270 may be electrically connected.

The electronic device according to the various embodiments of the present disclosure may include a housing. In the housing, a coil may be disposed for wireless charging. A fan may be disposed in proximity to the coil. A temperature sensor may be disposed in proximity to the coil.

According to the various embodiments of the present disclosure, a wireless charging circuit 200 may include a coil, and may transmit a power source wirelessly to an external device via the coil.

According to the various embodiments of the present disclosure, a control circuit 210 may be electrically connected to the air circulation generation member (e.g., a fan), the temperature sensor, and/or the wireless charging circuit 200. According to the various embodiments of the present disclosure, the control circuit 210 may receive a signal from the external device, may receive data related to a temperature of the coil from the temperature sensor, and may be configured to control the air circulation generation member (e.g., the fan) at least partially on the basis of the received signal and/or received data.

According to the various embodiments of the present disclosure, the wireless charging circuit 200 may include the signal processor 240, the coil 230, and/or the converter 260.

According to the various embodiments of the present disclosure, the temperature detector 220 may include a temperature sensor, and may recognize an output of the temperature sensor disposed in proximity to a heating source (e.g., a coil) of the wireless charging circuit.

According to the various embodiments of the present disclosure, the air circulation generation member 250 may include a fan, and may be disposed in proximity to the heating source of the wireless charging circuit to turn on or turn off the fan.

According to the various embodiments of the present disclosure, at least a part of the wireless charging circuit 200, control circuit 210, the temperature sensor 220, and air circulation generation member 250 may be included in a printed board assembly (PBA).

According to the various embodiments of the present disclosure, the control circuit 210 may be configured to control charging, heating control, and a communication operation with respect to an external device. According to an embodiment, the control circuit 210 may be configured to control a supply (or output) power source on the basis of a signal processed in the signal processor 240. According to an embodiment, the control circuit 210 may be configured to receive data related to the temperature of the coil from the temperature sensor 220 and to control the air circulation generation member 250 at least partially on the basis of the received data.

According to the various embodiments, the coil may transmit a signal related to a charging power source or wireless charging to an external electronic device. For another example, the coil may receive a signal transmitted from the external electronic device. According to an embodiment, the coil 230 of the wireless charging circuit 200 may transmit a converted AC power source to the external device.

According to the various embodiments, the temperature sensor 220 may perform an operation for sensing an internal and/or external temperature. For example, the temperature sensor 220 may sense data related to the temperature of the coil. For another example, the temperature sensor 220 may include one or more temperature sensors (e.g., a thermistor). For another example, the temperature sensor 220 may be located in proximity to a primary heating source of the wireless charging circuit 200. For example, a part of the temperature sensor constituting the temperature sensor 220 may be located in an upper portion of a shield member of the coil 230 and/or in the PBA. For another example, temperature sensors of the temperature sensor 220 may sense heat generated when power is transmitted from the coil 230.

According to the various embodiments, the air circulation generation member 250 may turn on or turn off a fan under the control of the control circuit 210. The temperature sensor 220 may sense an internal or external temperature of the wireless charging circuit 200.

According to the various embodiments, the signal processor 240 may sense data transmitted from the external electronic device via the coil 230 of the wireless charging circuit 200, and may transmit an operation and/or state information of the electronic device via the coil 230.

According to the various embodiments, the TA 270 may be electrically connected to the electronic device, and may generate at least one power source for wireless power transmission. In the various embodiments of the present disclosure, the TA 270 may generate a power source for basic charging and a power source for high-power charging. For another example, the TA 270 may be directly connected to an in-door AC power source, and may include an AC/DC converter to convert the AC power source to a DC power source for charging.

According to the various embodiments, the converter 260 may convert the DC power source of the TA 270 to an AC power source for charging through switching control.

According to the various embodiments, the control circuit 210 may perform a charging mode and a heating control operation. For example, the control circuit 210 may perform the charging mode upon sensing an approach of the external device via the temperature sensor 220, the coil 230, and the signal processor 240. For another example, the control circuit 210 may perform switching control on the converter 260 in the charging mode to convert the DC power source of the TA 270 to the AC power source for charging. For another example, the control circuit 210 may receive a charging complete signal transmitted from the external device via the coil 230 and the signal processor 240. For another example, upon receiving a charging complete signal of a battery from the external device in the charging mode or upon receiving a signal for informing that charging is performed with constant voltage during a specific time, the control circuit 210 may determine that it is a full-charging state and thus may end the charging mode. For another example, the control circuit 210 may turn the fan off when the charging mode ends.

In the various embodiments of the present disclosure, the control circuit 210 may perform a basic charging mode and/or a high-power charging mode. For example, the control circuit 210 may sense a type of the external device via the signal processor 240, and may provide control to determine a charging mode on the basis thereof and to perform the determined charging mode. For example, if the external device is a high-power charging enabled device, the control circuit 210 may perform a control and/or communication operation so that a high-power charging power source is generated if a high-power output is supported, by controlling the TA 270 and/or the converter 260. The converter 260 may convert a high-power DC charging power source generated in the TA 270 into an AC charging power source and may supply it to the coil 230. In an embodiment, the high-power charging mode may be a quick charging mode in which charging is performed with high voltage, and the basic charging mode may be a normal charging mode in which charging is performed with normal voltage.

According to the various embodiments, the control circuit 210 may receive information related to the temperature of the coil 230 via the temperature sensor 220, and may control an operation of the air circulation generation member 250 (e.g., the fan) on the basis of at least a part of the information related to the received temperature. For example, the air circulation generation member may be turned on or turned off. For another example, the control circuit 210 may perform comparative analysis with a set threshold on the basis of at least a part of the received temperature-related information, may turn on the air circulation generation member 250 if it is higher than the threshold on the basis of the analysis result, and may turn off the air circulation generation member 250 if it is lower than the threshold. According to the various embodiments, the threshold may be set to an upper threshold and/or a lower threshold, and the upper threshold may be a temperature value greater than the lower threshold.

According to the various embodiments of the present disclosure, the wireless charging circuit 200 may operate in a first mode (e.g., a basic charging mode) in which the power is transmitted with a first power source or a second mode (e.g., a high-power charging mode) in which the power is transmitted with a second power source which is higher than the first power source.

According to the various embodiments of the present disclosure, the control circuit 210 may be configured to select the first mode or the second mode at least partially on the basis of a signal received from the external device and/or data related to the temperature of the coil and received from the temperature sensor.

According to the various embodiments of the present disclosure, the control circuit 210 may further include a circuit for interfacing with an external power source, and may be configured to receive power of a different level from the external power source via the interfacing circuit on the basis of selection of the first mode or the second mode.

According to the various embodiments, the control circuit 210 may be configured to receive a signal from the external device via the wireless charging circuit, and the signal may include an indication for requesting for control of the fan or an indication regarding a level of power transmitted wirelessly to the external device.

According to the various embodiments, when the external device is in proximity to the electronic device (or the electronic device is in proximity to the external device), the control circuit 210 may perform a charging operation by controlling the wireless charging circuit 200. For example, if the external device is in proximity to the electronic device, the control circuit 210 may sense an approach of the external device via the coil 230 and the signal processor 240. For example, the control circuit 210 may control to perform a basic charging mode operation upon sensing the approach of the external device.

For another example, the control circuit 210 may analyze a device type of the external device via the signal processor 240. For example, the external device may be a device supporting quick charging or a device supporting only the basic charging mode. According to another example, if the external device is a device capable of supporting quick charging (e.g., an adaptive fast charging (AFC) device), the control circuit 210 may generate a high-power charging power source by controlling the TA 270 and/or the converter 260. For example, the basic charging power source may be 5 A/1 A, and the high-power charging power source may be 9V/1.67 A.

According to the various embodiments, the TA 270 may generate a DC power source and may supply it to the converter 260. According to the various embodiments, the TA 270 may be electrically connected to the electronic device, and may be connected, for example, through a connector (not shown) from outside the electronic device. In the charging mode, the control circuit 210 may perform switching control on the converter 260 to convert the DC power source of the TA 270 to an AC power source for charging.

According to the various embodiments, in the basic charging mode, the TA 270 may regulate a to-be-supplied power source by fixing voltage to the DC power source for basic charging and by varying current irrespective of the high-power charging mode. For another example, in the high-power charging mode, the TA 270 may regulate the to-be-supplied power source by fixing voltage to be higher than the reference voltage and by varying current. For example, a power source may be regulated in each mode so that the to-be-supplied power source can vary depending on a position between the external device and the electronic device, a battery charging level, a state of the external device, or the like.

According to the various embodiments, the control circuit 210 may control the TA 270 or may generate a DC power source for high-power charging or basic charging via a proper communication interface, and may perform switching control on the converter 260 to convert the DC power source for charging and generated in the TA 270 to an AC power source. For another example, the control circuit 210 may receive information related to a charging state of the external device via the signal processor 240, and may regulate current strength of a charging power source by analyzing the state information of the external device on the basis of the received information. For example, the control circuit 210 may decrease a to-be-supplied charging power source by increasing a switching control signal (or a switching frequency) according to the charging condition, or may increase the to-be-supplied charging power source by decreasing the switching control signal.

According to the various embodiments, the AC power source for charging and converted in the converter 260 may be transmitted wirelessly to the external device which is in proximity (or contact) via the coil 230 of the wireless charging circuit 200. For example, the external device may charge a battery by using a charging power source received wirelessly.

According to the various embodiments, the external device may charge the battery by using a charging power source transmitted from the electronic device. For example, the charging may operate with a high-power charging or basic charging power source. According to the various embodiments, if charging of the battery is close to full charging in the high-power charging operation, the external device may stop the high-power charging mode and may transmit a signal for changing to the basic charging mode to a power source supply device. For another example, the power source supply device may receive a signal for changing to the reference mode via the coil 230 of the wireless charging circuit 200, and the signal processor 240 may convert the signal into data and transmit it to the control circuit 210. For example, upon receiving a signal including at least a part of information related to the stopping of the high-power charging mode via the signal processor 240, the control circuit 210 may convert a high-power charging power source to a basic charging power source by controlling the TA 270 and/or the converter 260.

According to the various embodiments, upon completion of the charging, the electronic device may receive a signal including at least a part of information related to the end of the charging from the external device. According to an embodiment, the coil 230 of the wireless charging circuit 200 may receive information including at least a part of the information related to the end of the charging from the external device, and the received at least the part of information may be a signal for requesting to end the charging.

According to the various embodiments, the signal processor 240 may transmit at least a part of a signal at least partially related to the received signal to the control circuit 210.

According to the various embodiments, if the control circuit 210 receives the signal including at least the part of the information related to the end of charging from the signal processor 240, the charging operation may end by controlling the TA 270 and the converter 260.

According to the various embodiments, a charging power source transmitted from the electronic device may be expressed by a product of charging voltage and charging current. For example, the electronic device may use fixed voltage in each charging mode as charging voltage (e.g., charging voltage which is set in the high-power charging mode or the basic charging mode), and may variously control charging current according to a load condition and a charging state of each charging mode. According to the various embodiments, a heat generator of the electronic device may be a PBA and/or a coil or the like.

According to the various embodiments of the present disclosure, the electronic device may have a fan disposed in proximity to the heat generator (e.g., the coil) or between the heat generators (e.g., between the coil and the PBA). For another example, a temperature sensor (e.g., a thermistor) may be attached in proximity to the heat generator. For another example, if a heating temperature sensed in the charging mode while monitoring an output of the temperature sensor exceeds a set upper threshold, heat generation may be decreased by turning on the fan. For another example, if the heating temperature sensed in the charging mode is lower than a set lower threshold, the power source supply device may turn off the fan.

According to the various embodiments, the electronic device may control the driving of the fan on the basis of a type of the charging mode.

According to the various embodiments, if the external device is a high-power charging enabled device, the electronic device may control the TA 270 and/or the converter 260 to generate a charging power source for high-power charging and transmit it wirelessly to the external device.

According to the various embodiments, an operation in which the electronic device controls heat generation in the high-power charging mode is described. For example, upon changing from the basic charging mode to the high-power charging mode, the control circuit 210 may turn on the air circulation generation member 250 (e.g., the fan). For another example, if the heating temperature exceeds the set upper threshold in a state where the high-power charging mode is performed, the control circuit 210 may turn on the air circulation generation member 250. For another example, during the high-power charging mode is performed, a signal including at least a part of information related to a request for stopping the high-power charging may be received from the external device. For example, the coil 230 and/or signal processor 240 of the wireless charging circuit 200 may receive the signal including at least the part of information related to the request for stopping charging and transmitted from the external device, and may deliver the signal to the control circuit 210. For example, upon receiving the signal including at least the part of information related to the request for stopping charging, the control circuit 210 may control the TA 270 and/or the converter 260 to convert to the basic charging mode, and may control the air circulation generation member 250 to turn off the fan of the air circulation generation member 250. For another example, upon receiving the signal including at the least the part of information related to the request for stopping high-power charging from the external device, the control circuit 210 may control the TA 270 and/or the converter 260 to convert to the basic charging mode. For another example, the control circuit 210 may analyze a heating temperature of the heat generator (e.g., the coil 230). According to an embodiment, the control circuit 210 keeps a state in which the fan of the air circulation generation member 250 is turned on until the heating temperature sensed by the temperature sensor 220 depending on an analysis result of the heating temperature reaches the lower threshold, and may turn off the fan of the air circulation generation member 250 at a time when the heating temperature is lower than the lower threshold.

According to the various embodiments, the electronic device may perform an operation of controlling heat generation in the basic charging mode. For example, if the heating temperature sensed for the coil 230 via the temperature sensor 220 exceeds the set upper threshold in the basic charging mode, the control circuit 210 may turn on the air circulation generation member 250. For another example, if the heating temperature sensed for the coil 230 by the temperature sensor 220 is lower than the set lower threshold in the basic charging mode, the control circuit 210 may control the air circulation generation member 250 to be turned off.

According to the various embodiments, the basic charging mode may have a relatively lower heating condition than in the high-power charging mode. For another example, during the basic charging mode is performed, the control circuit 210 may turn off the fan of the air circulation generation member 250 at a time when the heating temperature sensed for the coil 230 by the temperature sensor 220 is lower than the lower threshold. According to the various embodiments, similarly to the high-power charging mode, the electronic device in the basic charging mode may also turn on or turn off the fan on the basis of a result of comparing each of the heating temperature sensed by the temperature sensor 220 and the upper and/or lower thresholds.

According to the various embodiments, the power source supply device may perform an operation of controlling heat generation when misalignment occurs in the charging mode. For example, if the misalignment occurs, power may be supplied with maximum possible current for more than a specific time in each charging mode by the coil 230 of the power source supply device.

For example, if the heating temperature sensed for the coil 230 via the temperature sensor 220 exceeds the set upper threshold in the misalignment state, the control circuit 210 may turn on the air circulation generation member 250. For another example, if the heat generation sensed for the coil 230 by the temperature sensor 220 is lower than the set lower threshold in the misalignment state, the control circuit 210 may turn off the air circulation generation member 250.

According to the various embodiments, an operation of controlling heat generation may be performed when the power source supply device is changed to a full charging state.

For example, during the charging mode is performed, the external device may generate a signal indicating full charging (or a signal for requesting to end the charging). For example, if a full charging signal is transmitted from the external device, the electronic device may receive the full charging signal. The coil 230 and/or signal processor 240 of the wireless charging circuit 200 may receive the full charging signal transmitted from the external device, and may deliver the received full charging signal to the control circuit 210. According to the various embodiments, upon receiving the signal indicating the full charging, the control circuit 210 may control the TA 270 and/or the converter 260 to end the charging mode, and may turn off the air circulation generation member 250 (e.g., the fan).

According to the various embodiments, the electronic device may turn off the air circulation generation member 250 by determining the full charging in the following state. For example, the electronic device may receive a charging complete signal transmitted from the external device via the signal processor 240. The control circuit 210 may immediately turn off the fan of the air circulation generation member 250 at a time when the charging complete signal is received. Alternatively, after receiving the charging complete signal, the control circuit 210 may analyze the heating temperature sensed by the temperature sensor 220, and may turn off the fan of the air circulation generation member 250 when the heating temperature is lower than the lower threshold. For another example, the electronic device may receive a signal regarding the change of the charging duration to a constant-voltage (CV) duration via the signal processor 240. For example, the control circuit 210 may immediately turn off the fan of the air circulation generation member 250 when a charging change signal (i.e., a CV signal) is received. Alternatively, after receiving the charging change signal (i.e., the CV signal), the control circuit 210 may analyze the heating temperature sensed by the temperature sensor 220. According to the various embodiments, the control circuit 210 may turn off the fan of the air circulation generation member 250 when the heating temperature is lower than the lower threshold. For another example, the control circuit 210 may use the signal processor 240 to analyze a charging power source transmitted wirelessly from the external device via the coil 230. The control circuit 210 may determine a full charging state when the charging power source is decreased for a specific time. If it is determined as the full charging state due to the decrease of the charging power source, the control circuit 210 may control the air circulation generation member 250 to immediately turn off the fan. Alternatively, the fan may be turned off when the charging power source is decreased for the specific time and the heating temperature sensed by the temperature sensor 220 is lower than the lower threshold.

The electronic device according to the various embodiments may control the charging operation as the basic charging mode in the following state, if the external device is a device supporting the high-power charging mode.

The electronic device according to the various embodiments may perform the basic charging mode at a specific time. For example, if it is determined that a state where the external device is not used is continued for a long period of time, the control circuit 210 may perform the basic charging mode instead of performing the high-power charging mode. That is, if a time at which the charging mode is performed is a specific time (for example, a time duration in which a user of the external device is sleeping, e.g., 22:00 to 6:00 next day), the control circuit 210 may perform the basic charging mode irrespective of a type of the external device. For another example, if the external device transmits a signal including at least a part of information related to stopping of the high-power charging mode, the signal processor 240 may deliver to the control circuit 210 the signal including at least the part of information related to the stopping of high-power charging and received via the coil 230 of the wireless charging circuit 200. According to the various embodiments, upon receiving the signal including at least the part of information related to the request for ending high-power charging, the control circuit 210 may control the TA 270 and/or the converter 260 to perform the charging operation in the basic charging mode. For another example, the external device may have a function capable of selecting the high-power charging mode or the basic charging mode. If the external device requests for the basic charging mode, the electronic device may perform the charging operation in the basic charging mode even in case of the external device capable of performing the high-power charging mode. For another example, the power source supply device may stop the high-power charging mode if a heating temperature of the coil 230 is sensed to be higher than or equal to a set temperature (i.e., a high-power charging limit temperature). For example, the high-power charging limit temperature may be a temperature which is higher than a temperature of the upper threshold. For example, the temperature of the upper threshold may be set to 39 degrees, and the high-power limit temperature may be set to 41 degrees. In this case, if the heating temperature of the coil 230 has a value in the range of 39 degrees to 41 degrees, the electronic device may perform the high-power charging mode while turning on the fan. For another example, if the heating temperature of the coil 230 exceeds the high-power charging limit temperature (e.g., 41 degrees), the power source supply device may control the TA 270 and the converter 260 to change the charging mode (the change from the high-power charging mode to the basic charging mode), or may stop the charging operation until the heating temperature is decreased to a set temperature (e.g., an upper threshold temperature value).

According to the various embodiments, the wireless charging circuit 200 of the electronic device may include a fan capable of decreasing an internal heating temperature and/or a temperature sensor capable of detecting the heating temperature. According to the various embodiments, the fan may be the air circulation generation member 250, and the temperature sensor may be the temperature sensor 220. According to the various embodiments, the electronic device may keep or change the charging mode on the basis of at least a part of a device type and/or charging state of the external device or a charging state of the electronic device, and may control the fan on the basis of a heating temperature increased or decreased during charging. According to the various embodiments, an operation of controlling the fan may include an operation of turning on/off the fan or an operation of controlling a rotation speed of the fan. According to the various embodiments, a scenario of driving the fan may be expressed by Table 1 below.

TABLE 1

| Classification | Fan drive | Condition |
|---|---|---|
| high-power charging mode | on | when starting the high-power charging mode or changing the basic charging mode to the high-power charging mode, or when the heating temperature is equal or higher than an upper threshold value in the high-power charging mode. |
| | off | when the heating temperature is lower than threshold value (e.g., the upper threshold value when the fan is in an off state or a lower threshold value when the fan changes from an on state to the off state) in the high-power charging mode or when changing the high-power charging mode to the basic charging mode (the fan is off immediately or when the heating temperature is lower than the lower threshold value). |
| basic charging mode | on | when the heating temperature is equal or higher than the upper threshold value in the basic charging mode. |
| | off | when the heating temperature is lower than threshold value in the basic charging mode (the fan is off immediately or when the heating temperature is lower than the lower threshold value). |
| mis-align | on | when the heating temperature is equal or higher than the upper threshold value in the mis-align state. |
| | off | when the heating temperature is lower than the lower threshold value in the mis-align state. |
| full charging | off | the fan is off immediately or when the heating temperature is lower than the lower threshold value. |

Figure 3:
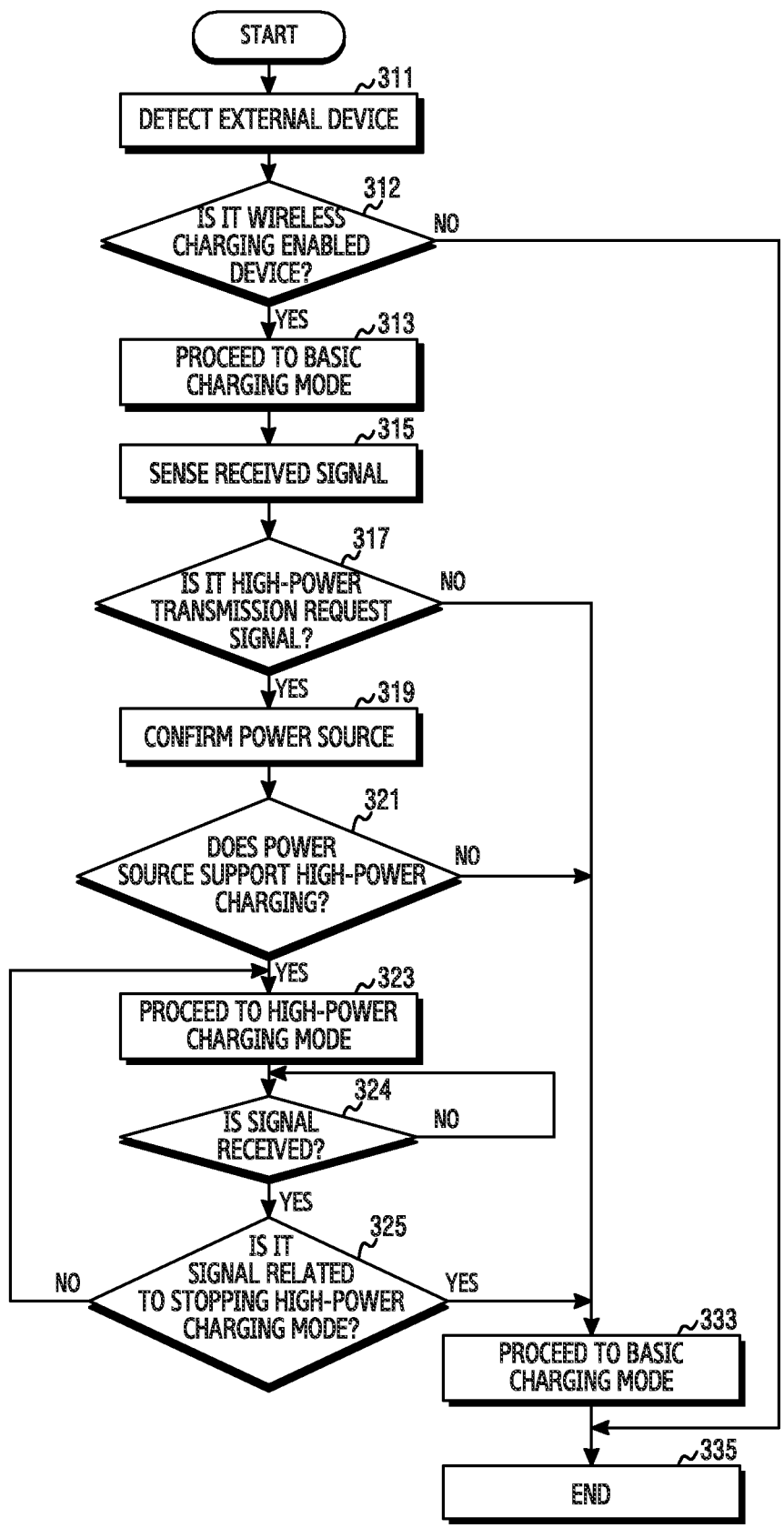
FIG. 3 is a flowchart illustrating a procedure of performing a charging mode in a power source supply device according to various embodiments of the present disclosure.

FIG. 3 is a flowchart illustrating a procedure of a charging operation of an electronic device according to various embodiments of the present disclosure.

Referring to FIG. 3, according to the various embodiments of the present disclosure, in operation 311, the electronic device may sense a proximity (or a contact) of an external device.

According to the various embodiments, in operation 312, the electronic device may determine whether the external device of which the approach is sensed is a wireless charging enabled device.

If it is determined in operation 312 that the external device is not the wireless charging enabled device, the procedure may end in operation 335 according to the various embodiments of the present disclosure.

If it is determined in operation 312 that the external device is the wireless charging enabled device, the electronic device may perform the charging operation in the basic charging mode in operation 313 according to the various embodiments of the present disclosure. For example, in the basic charging mode, the electronic device may convert a DC power source for basic charging to an AC power source via the TA 270 by performing switching control in the converter 260. For another example, the coil 230 of the wireless charging circuit 200 may wirelessly transmit, to the external device in proximity, the AC power source which is for basic charging and which is output from the converter 260.

According to the various embodiments of the present disclosure, in operation 315, the electronic device may perform an operation of sensing a signal transmitted from the external device. For example, the signal may be received and/or sensed from the external device via the coil 230 and/or the signal processor 240 of the electronic device. For another example, the electronic device may sense a signal (data) including at least a part of information related to charging via the coil 230 and/or the signal processor 240. According to the various embodiments, the related information may include information related to a device type of the external device, and the information related to the device type may include information indicating whether high-power charging is possible.

According to the various embodiments of the present disclosure, in operation 317, whether it is a high-power transmission request signal may be determined. For example, the electronic device may determine whether it is the high-power transmission request signal on the basis of at least a part of the signal sensed in operation 315. For another example, the electronic device may analyze the device type of the external device on the basis of at least the part of the received signal, and if the external device is the high-power charging enabled device, may determine this as a high-power charging request.

If it is determined in operation 317 that it is the high-power transmission request signal, a power source confirmation operation may be performed in operation 319. For example, the electronic device may confirm whether the TA 270 can generate high power. For example, if the external device is the high-power charging enabled device, interface (e.g., AFC) communication may be performed with respect to the TA 270 in order to confirm whether the TA 270 electrically connected to the electronic device 201 of FIG. 2 can supply high power.

In operation 321, the electronic device may determine whether a power source (e.g., the TA) supports high-power charging. For example, the determination operation may operate on the basis of at least a part of information confirmed in operation 319.

If it is determined in operation 321 that the power source supports high-power charging, the electronic device may proceed to the high-power charging mode in operation 323 according to the various embodiments of the present disclosure. For example, in the high-power charging mode, the electronic device may provide control such that the TA 270 can generate a DC power source for high-power charging via the control circuit and can convert a DC power source to the AC power source via the converter 260. According to the various embodiments, the AC power source converted by the converter 260 is supplied to the coil 230, and the coil 230 may wirelessly transmit the AC power source for high-power charging to the external device.

According to the various embodiments of the present disclosure, in operation 324, the electronic device may determine whether a signal is received from the external device. For example, the electronic device may perform the charging operation in the high-power charging mode, and may determine whether there is a signal received via the coil 230 and/or the signal processor 240.

If it is determined in operation 324 that the signal is received, the electronic device may determine whether a signal related to stopping of the high-power charging mode is received in operation 325 according to the various embodiments of the present disclosure.

If it is determined in operation 325 that it is not the signal related to the stopping of the high-power charging mode, the electronic device may keep performing the charging operation in the high-power charging mode in operation 323 according to the various embodiments of the present disclosure.

If it is determined in operation 325 that it is the signal related to the stopping of the high-power charging mode, the electronic device may proceed to the basic charging mode in operation 333 according to the various embodiments of the present disclosure. For example, the electronic device may perform the charging operation by changing from the high-power charging mode to the basic charging mode.

If it is determined in operation 317 that it is not the signal for requesting for high-power transmission, the electronic device may proceed to the basic charging mode in operation 333 according to the various embodiments of the present disclosure.

If it is determined in operation 321 that the power source does not support high-power charging, the electronic device may proceed to the basic charging mode in operation 333 according to the various embodiments of the present disclosure.

According to the various embodiments of the present disclosure, if the external device is a high-power charging disabled external device or if the external device transmits a signal for requesting for the basic charging mode, the electronic device may proceed to the basic charging mode in operation 333 according to the various embodiments of the present disclosure.

According to the various embodiments of the present disclosure, if the external device has requested for high-power charging but the TA 270 is a device which cannot provide a high-power charging power source, the electronic device may proceed to the basic charging mode according to the various embodiments of the present disclosure.

According to the various embodiments of the present disclosure, after proceeding to the basic charging mode, if the charging is complete, the power source supply device may end the charging operation in operation 335.

According to the various embodiments of the present disclosure, in the basic charging mode, the control circuit 210 may control the TA 270 to generate a DC power source for basic charging, and may control the converter 260 to convert the basic charging DC power source to the AC power source and supply it to the coil 230 of the wireless charging circuit 200. The coil 230 may wirelessly transmit the supplied basic charging AC power source to the external device.

The electronic device according to the various embodiments of the present disclosure may receive a signal related to at least a part of information related to charging from the external device during the charging is performed, and may control a state of wireless power transmission which is currently performed on the basis of at least a part of the received signal. For example, if the received data is related to a signal regarding a decrease in a power amount, the electronic device may perform transmission by decreasing current to be transmitted wirelessly to the external device. Alternatively, if the received signal is a signal related to an increase in the power amount, the electronic device may control to perform transmission by increasing current to be transmitted wirelessly to the external device. For another example, the electronic device may control the TA 270 and/or the converter 260 to regulate current of a charging power source to be transmitted wirelessly to the external device.

The electronic device according to the various embodiments of the present disclosure may sense an internal or external temperature of the wireless charging circuit 200 via the temperature sensor 220 when performing a wireless charging control operation. If the sensed temperature exceeds the upper threshold, the electronic device may drive the fan via the air circulation generation member 250. In a state of driving the fan, the temperature sensor 220 may sense the internal or external temperature of the wireless charging circuit 200. If the sensed temperature is lower than the lower threshold, the electronic device may turn off the fan of the air circulation generation member 250.

According to the various embodiments of the present disclosure, the control circuit 210 of the electronic device may analyze a charging power source transmitted wirelessly to the external device via the signal processor 240 connected to the coil 230 of the wireless charging circuit 200. The electronic device may control the charging power source transmitted wirelessly to the external device according to the analyzed charging power source. For example, if the wirelessly transmitted charging power source is decreased for a specific time, the electronic device may control the TA 270 and/or the converter 260 to regulate current of the charging power source transmitted wirelessly to the external device.

Figure 4A:
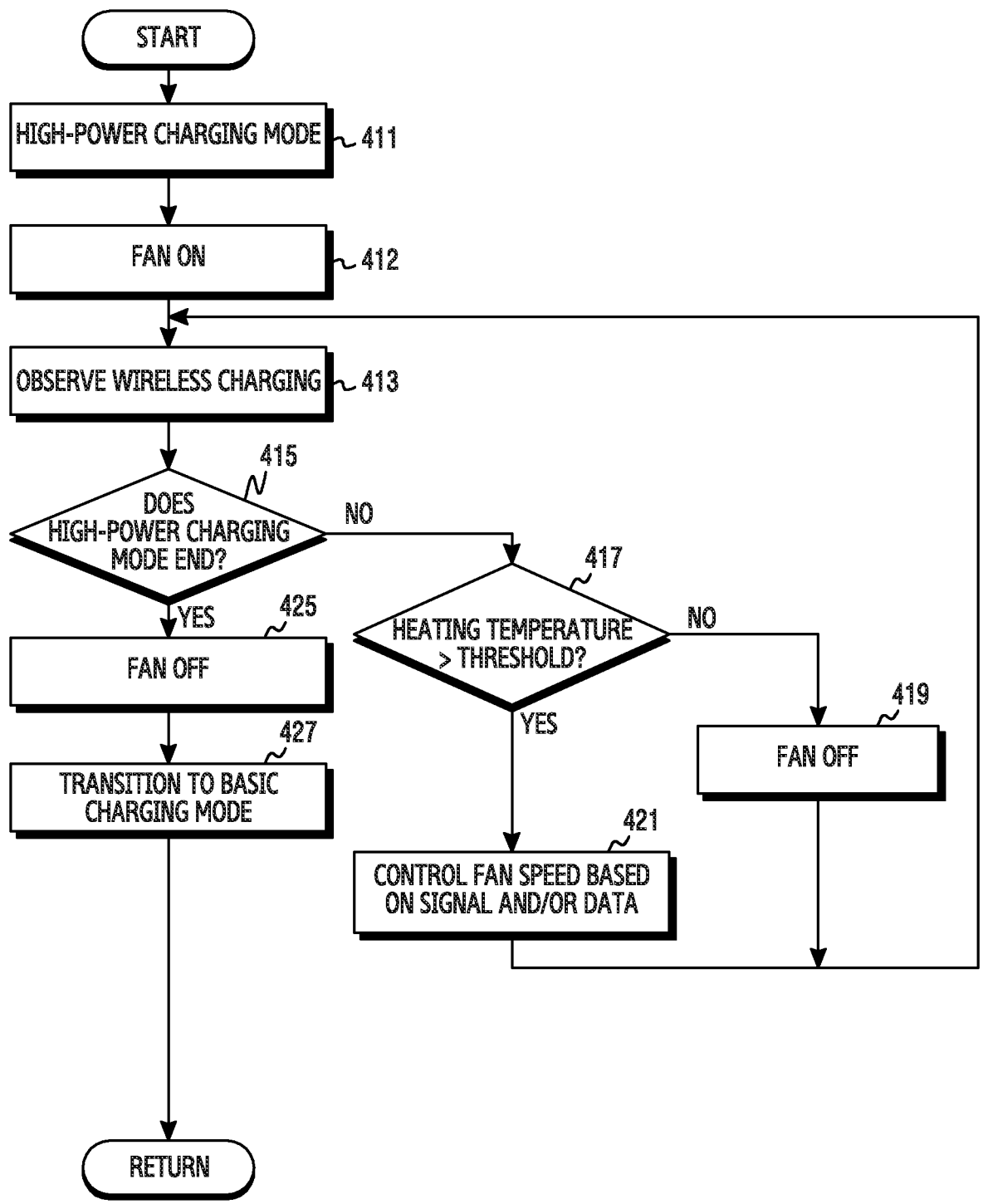
FIG. 4A is a flowchart illustrating a procedure of performing a high-power charging mode in a power source supply device according to various embodiments of the present disclosure.

FIG. 4A is a flowchart illustrating a procedure of performing a high-power charging mode in a power source supply device according to various embodiments of the present disclosure.

Referring to FIG. 4A, according to the various embodiments of the present disclosure, in operation 411, an electronic device may perform the high-power charging mode. For example, the TA 270 may generate a DC power source for high-power charging in the high-power charging mode, and the converter 260 may be switched under the control of the control circuit 210 and thus may convert the DC power source for high-power charging and output from the TA 270 into an AC power source. According to another example, charging current may be regulated by a switching frequency of the converter 260. For another example, in the high-power charging power source, charging voltage may be fixed and charging current may be variable according to a charging condition.

According to the various embodiments of the present disclosure, in operation 412, the power source supply device may turn the fan on via the air circulation generation member 250. For example, if the charging operation is performed in the high-power charging mode, the fan may be turned on.

According to the various embodiments, in operation 413, the electronic device may perform a wireless charging observation operation. For example, the observation operation may be performed on the basis of at least a part of information acquired via the temperature sensor, coil, or signal processor 240 included in the wireless charging circuit 200.

According to the various embodiments of the present disclosure, in operation 415, whether the high-power charging mode ends may be determined at least partially on the basis of the wireless charging observation operation of operation 413.

If it is determined in operation 415 that the high-power charging does not end, whether a heating temperature is higher than a threshold may be determined in operation 417 according to the various embodiments of the present disclosure. For example, the heating temperature may be a heating temperature sensed via the temperature sensor 220 when performing the wireless charging observation operation, and an operation of comparing this temperature with a determined threshold may be performed.

If it is determined in operation 417 that the heating temperature exceeds a threshold, the electronic device may adjust a speed of driving the fan on the basis of at least a part of a signal and/or data in operation 421 according to the various embodiments of the present disclosure. For example, the electronic device may variably control a fan rotation speed according to the heating temperature detected for the wireless charging circuit 200 by the temperature sensor 220.

If it is determined in operation 417 that the heating temperature is lower than the threshold, the power source supply device may turn the fan off in operation 419 according to the various embodiments of the present disclosure. For example, if the heating temperature is lower than the threshold, the fan may be turned off.

According to the various embodiments of the present disclosure, the wireless charging observation of operation 413 may be performed for a signal received via the coil 230 of the wireless charging circuit 200 and/or a state or the like of a charging power source wirelessly transmitted from the coil 230 of the wireless charging circuit 200. For example, the received data may be a signal transmitted from the external device. For example, the external device may generate a signal for changing from the high-power charging mode to the basic charging mode according to a charging state. For example, the external device may end the high-power charging mode when charging of a battery reaches a set charging amount during the high-power charging, and may generate a signal for changing to the basic charging mode. For example, the electronic device may observe the state of the charging power source transmitted wirelessly to the external device via the coil 230. If the charging power source transmitted wirelessly via the coil 230 in the high-power charging mode is decreased for a specific time, the electronic device may stop the high-power charging mode.

If it is determined in operation 415 that the high-power charging ends, the power source supply device may turn off the fan of the air circulation generation member 250 in operation 425 according to the various embodiments of the present disclosure.

It may be changed to the basic charging mode in operation 427 according to the various embodiments of the present disclosure. For example, it may be changed to the basic charging mode by controlling the TA 270 and/or the converter 260.

In case of operations 425 and 427 according to the various embodiments of the present disclosure, operation 427 may be first performed and thereafter operation 425 may be performed. For another example, operation 425 may be skipped and the fan driving may be controlled in the basic charging mode. For example, the electronic device may turn the fan off in case of changing from the high-power charging mode to the basic charging mode, or may turn the fan off at a time when a heating temperature is lower than a lower threshold after transitioning to the basic charging mode.

According to the various embodiments, the electronic device may have an upper threshold and a lower threshold to have a hysteresis characteristic (or Schmitt trigger characteristic) when controlling the turn on/turn off of the fan via the air circulation generation member 250.

According to the various embodiments, if the fan is turned on, the power source supply device may frequently perform the operation of turning on/turning off the fan when the heating temperature sensed by the temperature sensor 220 is within a specific range.

Figure 4B:
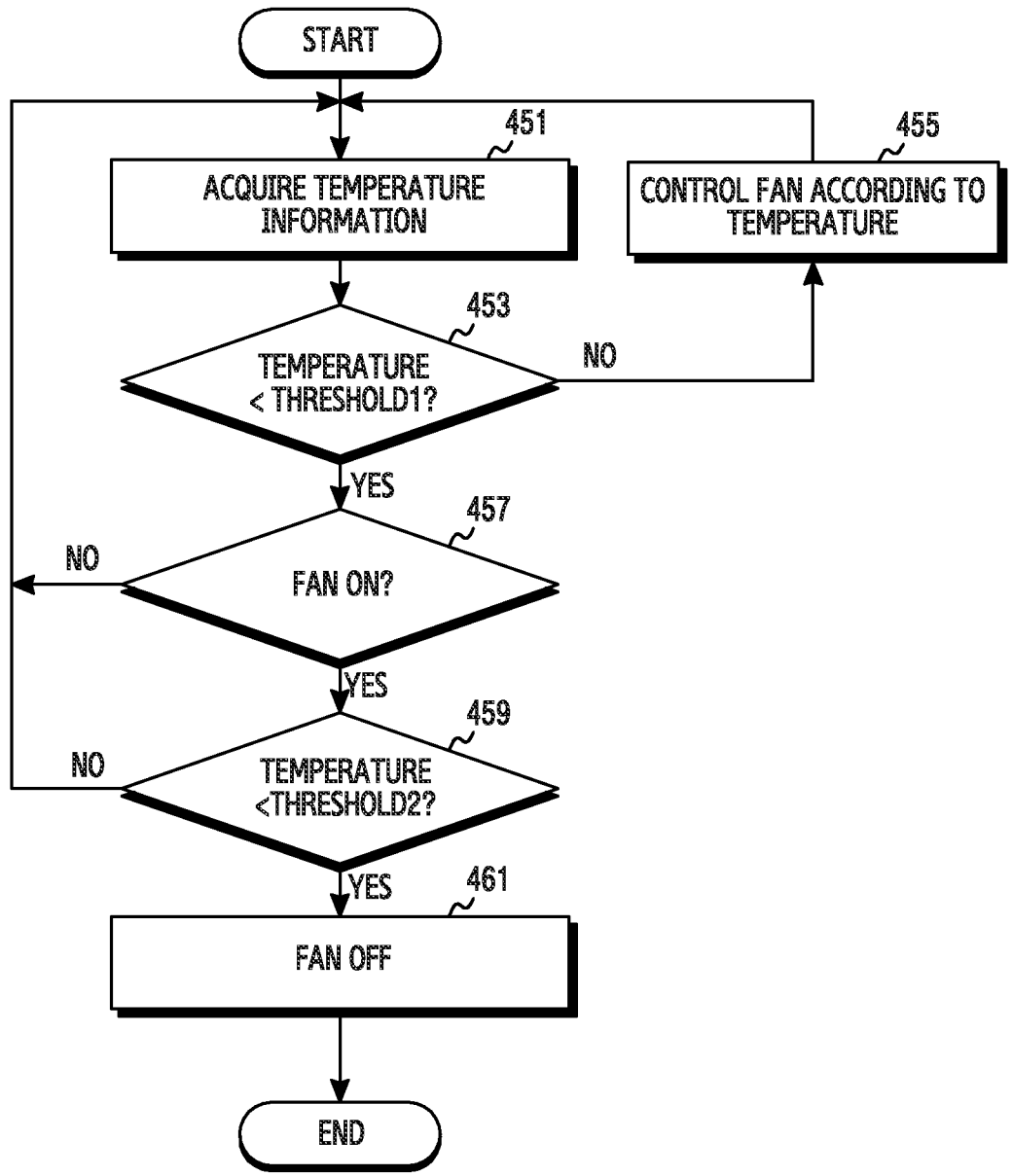
FIG. 4B is a flowchart illustrating a method of controlling driving of a fan by an electronic device on the basis of a heating temperature according to various embodiments of the present disclosure.

FIG. 4B is a flowchart illustrating a method of controlling driving of a fan by an electronic device on the basis of a heating temperature according to various embodiments of the present disclosure.

Referring to FIG. 4B, according to the various embodiments, in operation 451, a control circuit of the electronic device may acquire data related to a heating temperature sensed for a wireless charging circuit via the temperature sensor 220.

According to the various embodiments of the present disclosure, in operation 453, whether the temperature is lower than a threshold 1 (e.g., an upper threshold) may be determined. For example, the temperature may be temperature information acquired in operation 451.

If it is determined in operation 453 that the temperature is not lower than the threshold 1, the electronic device may control the driving of the fan on the basis of the temperature in operation 455 according to the various embodiments of the present disclosure. For example, if the temperature sensed by the temperature sensor 220 exceeds the upper threshold, the electronic device may turn the fan on via the air circulation generation member 250. The electronic device according to the various embodiments may control a fan rotation speed on the basis of a signal and/or data when driving the fan. For example, if the fan is turned on in a high-power charging mode, the fan rotation speed may be adjusted on the basis of the heating temperature sensed by the temperature sensor 220. For another example, if the heating temperature exceeds the upper threshold and thereafter rises to up to a high-power charging limit temperature, the electronic device may limit high-power charging and may adjust the fan rotation speed to a maximum speed.

If it is determined in operation 453 that the temperature is lower than the threshold 1, whether it is a state where the fan is on may be determined in operation 457 according to the various embodiments of the present disclosure.

If it is determined in operation 457 that the fan is turned on, the electronic device may determine whether the temperature is lower than a threshold 2 in operation 459 according to the various embodiments of the present disclosure. For example, the temperature may be temperature information acquired in operation 451.

If it is determined in operation 459 that the temperature is lower than the threshold 2, the electronic device may turn the fan off via the air circulation generation member 250 in operation 461 according to the various embodiments of the present disclosure.

According to the various embodiments, if the heating temperature sensed for the control circuit 210 via the temperature sensor 220 is lower than the threshold (e.g., the lower threshold) in a state where the fan is on, the electronic device may turn the fan off via the air circulation generation member 250. According to the various embodiments, the power source supply device may keep the state where the fan is on if the heating temperature is lower than the upper threshold but is higher than the lower threshold in the state there the fan is turned on.

Figure 5:
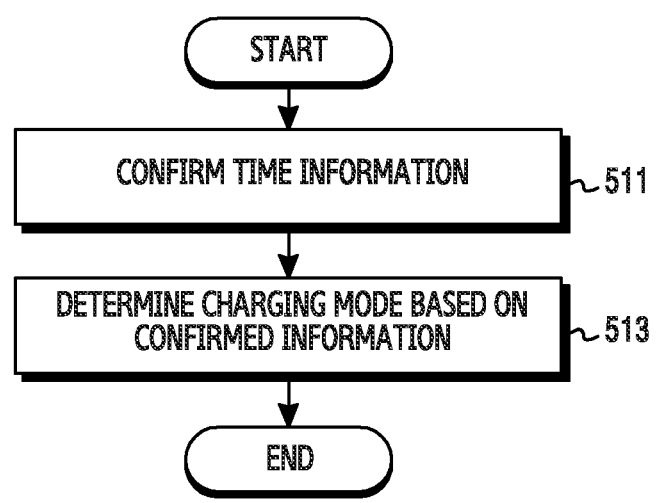
FIG. 5 is a flowchart illustrating an operation of ending a high-power charging mode in a power source supply device according to various embodiments of the present disclosure.

FIG. 5 is a flowchart illustrating an operation of ending a high-power charging mode in a power source supply device according to various embodiments of the present disclosure. The various embodiments of FIG. 5 may be an example of the wireless charging observation operation of FIG. 4A.

Referring to FIG. 5, according to the various embodiments of the present disclosure, in operation 511, the electronic device may confirm time information. For example, the time information may be received from an external device, or a charging time may be confirmed on the basis of information acquired from the electronic device.

According to the various embodiments of the present disclosure, in operation 513, the electronic device may determine a charging mode on the basis of the confirmed information. For example, the electronic device may perform a basic charging mode at a specific time. For example, the basic charging mode may be performed irrespective of a type of the external device at a specific time of performing the charging mode (e.g., a sleep time of a user, a time period in which the user does not use the external device for a specific time, a time which is set by the user, or the like).

The electronic device according to the various embodiments of the present disclosure may perform an operation of determining whether a current time is equal to a set time on the basis of at least a part of the confirmed information in operation 511. For example, the set time may be a time which is set to charge the external device in the basic charging mode. For example, if it is the time which is set for charging in the basic charging mode, the electronic device may transition to the basic charging mode. If the high-power charging mode is performed before the set time, the electronic device according to the various embodiments may control the TA 270 and the TA 270 to stop the high-power charging mode, and may transition to the basic charging mode.

If the electronic device according to the various embodiments of the present disclosure receives a signal related to the stopping of the high-power charging mode from the external device, the electronic device may stop the performing of the high-power charging mode. For example, if the electronic device receives a high-power charging stop request signal from the external device in a state of performing the charging operation in the high-power charging mode, the high-power charging mode may be stopped to transition to the basic charging mode. For example, the electronic device may receive the high-power charging stop request signal transmitted from the external device via the coil 230 and the signal processor 240.

The electronic device according to the various embodiments may determine whether the heating temperature sensed for the control circuit 210 via the temperature sensor 220 is greater than or equal to a high-power charging limit temperature. According to the various embodiments, the high-power charging limit temperature may be higher than a temperature of the upper threshold. For example, if the heating temperature of the wireless charging circuit has a value in the range from the upper threshold to the high-power charging limit temperature, the electronic device may determine a corresponding temperature, may turn the fan on via the air circulation generation member 250, and may perform the high-power charging mode. For example, if the heating temperature of the wireless charging circuit exceeds the high-power charging limit temperature, the electronic device may recognize the high-power charging limit temperature and may control the TA 270 and the converter 260 to change the charging mode. For example, the electronic device may change the charging mode from the high-power charging mode to the basic charging mode. For example, the electronic device may stop the charging mode.

According to the various embodiments of the present disclosure, in the basic charging mode, the electronic device may control the driving of the fan by confirming a signal received from the external device and/or data related to the heating temperature of the wireless charging circuit 200 while generating a charging power source as a reference power source.

In the electronic device according to the various embodiments of the present disclosure, if the heating temperature sensed for the wireless charging circuit 200 by the temperature sensor 220 exceeds the set upper threshold in the basic charging mode, the control circuit 210 may control the air circulation generation member 250 to turn on the fan of the wireless charging unit. The electronic device according to the various embodiments may turn off the fan if the heating temperature sensed for the wireless charging circuit 200 by the temperature sensor 220 is lower than a set lower threshold. The electronic device according to the various embodiments may turn off the fan via the air circulation generation member 250 if it is a state where the fan is off in the basic charging mode and if the currently sensed heating temperature is lower than the upper threshold. If it is a state where the fan is on in the basic charging mode, the electronic device according to the various embodiments may turn off the fan at a time when the heating temperature sensed for the wireless charging circuit 200 by the temperature sensor 220 is lower than the lower threshold.

Figure 6:
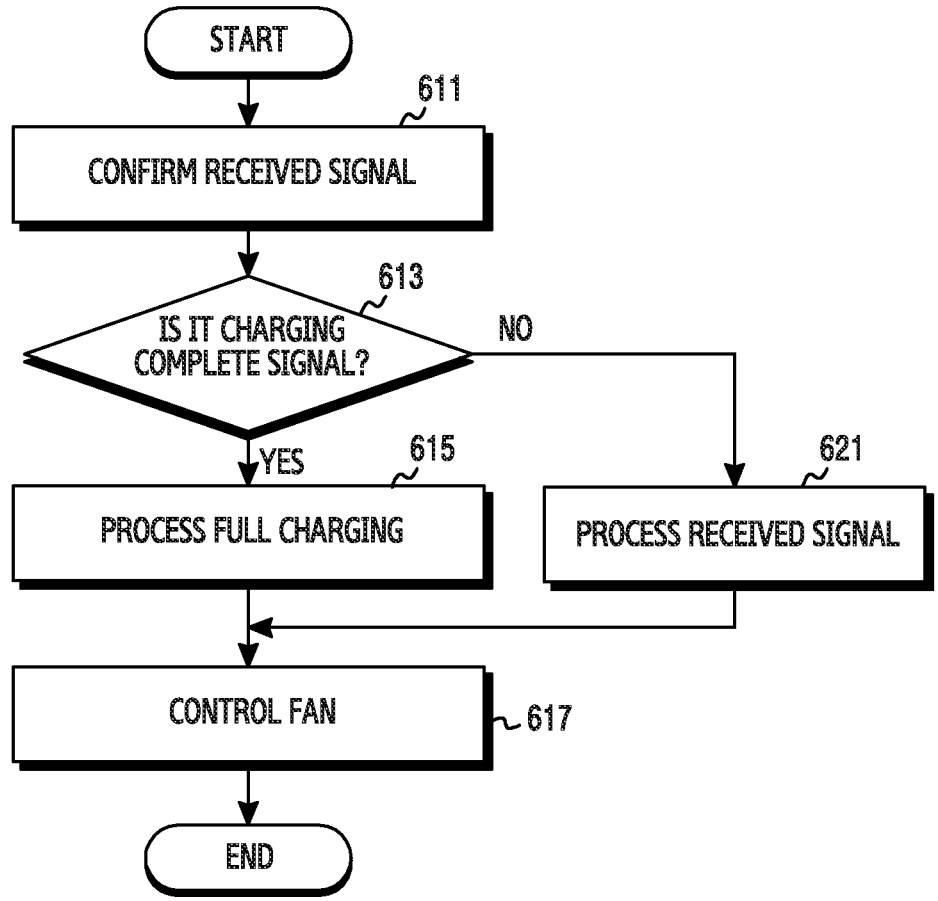
FIG. 6 is a flowchart illustrating an operation when full charging is achieved in an electronic device according to various embodiments of the present disclosure.

FIG. 6 is a flowchart illustrating an operation when full charging is achieved in an external device according to various embodiments of the present disclosure.

Referring to FIG. 6, according to the various embodiments of the present disclosure, in operation 611, an electronic device may confirm a signal transmitted from the external device. For example, when charging is complete, the external device may transmit a charging complete signal to the electronic device.

According to the various embodiments of the present disclosure, in operation 613, the electronic device may determine whether it is the charging complete signal.

If it is determined in operation 613 that it is the charging complete signal, the electronic device may perform a full charging processing operation in operation 615 according to the various embodiments of the present disclosure. For example, the electronic device may control the TA 270 and/or the converter 260 to perform the full charging processing operation.

According to the various embodiments of the present disclosure, in operation 617, the electronic device may control a fan.

If it is determined in operation 613 that the received signal is not the charging complete signal, the electronic device may process the received signal in operation 621 according to the various embodiments of the present disclosure. For example, the signal may be a signal received from the external device, and the signal may include at least a part of information related to charging. For example, the signal received by the electronic device from the external device may be information related to a charging duration. For example, if the external device is changed from a constant-current (CC) duration to a CV duration, the signal may include information related to the generated CV duration. According to the various embodiments, the electronic device may receive a signal transmitted from the external device via the coil 230 and/or signal processor 240 of the wireless charging circuit 200. For example, upon receiving the charging complete signal, the electronic device may sense the reception of the signal related to the charging completion, and may control the TA 270 and/or the converter 260 to end the supply of a charging power source (e.g., full charging processing). For example, if the supply of the charging power source ends, the electronic device may turn off the fan via the air circulation generation member 250. For example, if the signal transmitted from the external device is a signal including at least a part of information related to the CV duration, the electronic device may end the supply of charging power source on the basis of at least the part of the received signal, and may turn off the fan. For example, if the signal transmitted from the external device is not the charging complete signal or the signal including at least the part of the information related to the CV duration, the electronic device may perform an operation of processing the received signal. For example, the operation of receiving the received signal may be an operation of changing a charging mode on the basis of at least a part of the received signal. For example, if the received signal is a signal for requesting to change from the high-power charging mode to the basic charging mode, the power source supply device may control the TA 270 and the converter 260 to supply a charging power source of the basic charging mode.

The electronic device according to the various embodiments of the present disclosure may analyze the charging power source transmitted wirelessly from the coil 230 of the wireless charging circuit 200 to the external device. If the wirelessly transmitted charging power source is decreased on the basis of the analysis result, the electronic device may end the supply of the charging power source and may turn off the fan.

According to the various embodiments of the present disclosure, if it is determined as a full charging state, the electronic device may control the TA 270 and/or the converter 260 to end the supply of the charging power source. For example, the electronic device may turn the fan off via the air circulation generation member 250. For example, if the electronic device performs a full charging control operation, although it is described that the electronic device ends the supply of the charging power source and thereafter turns the fan off, an operation of turning the fan off may be first performed and thereafter an operation of ending the supply of the charging power source may be performed.

According to various embodiments of the present disclosure, an electronic device may include: a housing; a wireless charging coil disposed inside the housing; a fan disposed inside the housing and in proximity to the coil; a temperature sensor disposed inside the housing and in proximity to the coil; a wireless charging circuit having the coil and configured to transmit power wirelessly to an external device via the coil; and a control circuit electrically connected to the fan, the temperature sensor, and the wireless charging circuit. The control circuit may be configured for receiving a signal from the external device, receiving data related to a temperature of the coil from the temperature sensor, and controlling the fan at least partially on the basis of the signal and/or the data.

According to the various embodiments of the present disclosure, the wireless charging circuit may be capable of operating in a first mode for transmitting the power with a first power source or a second mode for transmitting the power with a second power source having higher power than the first power source. The control circuit may be allowed to select the first mode or the second mode at least partially on the basis of the signal and/or the data.

According to the various embodiments of the present disclosure, the control circuit may further include a circuit for interfacing with an external power source, and may be configured to receive power of a different level from the external power source via the circuit for interfacing on the basis of the first mode or the second mode.

According to the various embodiments of the present disclosure, the control circuit may be configured to turn on or turn off the fan at least partially on the basis of the signal and/or the data.

According to the various embodiments of the present disclosure, the control circuit may be configured to adjust a rotation speed of the fan at least partially on the basis of the signal and/or the data.

According to the various embodiments of the present disclosure, the control circuit may be configured to receive a signal from the external device via the wireless charging circuit.

According to the various embodiments of the present disclosure, the signal from the external device may include an indication for requesting for the control of the fan.

According to the various embodiments of the present disclosure, the signal from the external device may include an indication regarding a level of power transmitted wirelessly to the external device via the coil.

According to the various embodiments of the present disclosure, the electronic device may constitute a part of furniture, a building structure, a vehicle, and a white appliance.

According to various embodiments of the present disclosure, an electronic device may include: a housing; a wireless charging coil disposed inside the housing; a fan disposed inside the housing and in proximity to the coil; a temperature sensor disposed inside the housing and in proximity to the coil; and a wireless charging circuit having the coil and configured to transmit power wirelessly to an external device via the coil, and may perform an operation including: receiving a signal from the external device; receiving data related to a temperature of the coil from the temperature sensor; and controlling the fan at least partially on the basis of the signal and/or the data.

According to the various embodiments of the present disclosure, the wireless charging circuit may be capable of operating in a first mode for transmitting the power to a first power source or a second mode for transmitting the power to a second power source having higher power than the first power source. The operation of controlling the fan may further include selecting the first mode or the second mode at least partially on the basis of the signal and/or the data.

According to the various embodiments of the present disclosure, the electronic device may further include a circuit for interfacing with an external power source. The operation of controlling the fan may be performed to receive power of a different level from the external power source via the circuit for interfacing on the basis of the first mode or the second mode.

According to the various embodiments of the present disclosure, the operation of controlling the fan may be performed to turn on or turn off the fan at least partially on the basis of the signal and/or the data.

According to the various embodiments of the present disclosure, the operation of controlling the fan may be performed to adjust a rotation speed of the fan at least partially on the basis of the signal and/or the data.

According to the various embodiments of the present disclosure, the operation of controlling the fan further may include receiving a signal from the external device via the wireless charging circuit.

According to the various embodiments of the present disclosure, the signal from the external device may include an indication for requesting for the control of the fan.

According to the various embodiments of the present disclosure, the signal from the external device may include an indication regarding a level of power transmitted wirelessly to the external device via the coil.

According to the various embodiments of the present disclosure, the electronic device may constitute a part of furniture, a building structure, a vehicle, and a white appliance.

Various embodiments of the present disclosure may include a charging coil disposed inside a housing, a fan disposed in proximity to the charging coil, a temperature sensor disposed in proximity to the charging coil, and may include operations of: supplying a power source of high power in a high-power charging mode to the charging coil for wirelessly transmitting the supplied charging power source to an external device; sensing a heating temperature from the temperature sensor and if the heating temperature exceeds a threshold, turning the fan on; and if a high-power charging mode stop request signal is received from the external device, transitioning to a basic charging mode and turning the fan off.

The various embodiments of the present disclosure may further include an operation of performing the basic charging mode upon sensing an approach of the external device, and if the approached external device is a high-power charging enabled external device, setting the high-power charging mode and turning the fan on.

The various embodiments of the present disclosure may further include operations of: supplying a power source of basic power in the basic charging mode to the wireless charging circuit; sensing a heating temperature from the temperature sensor and if the heating temperature exceeds a threshold, turning the fan on; and turning off the fan upon sensing full charging.

According to the various embodiments of the present disclosure, the operation of turning the fan on may further include operations of: turning the fan on if the heating temperature exceeds an upper threshold in each of the charging modes; and turning the fan off if the heating temperature is lower than a lower threshold while driving the fan.

The various embodiments of the present disclosure may further include operations of: sensing a misalignment in each of the charging modes; sensing a heating temperature from the temperature sensor upon sensing the misalignment; and turning the fan on if the heating temperature exceeds the upper threshold.

According to the various embodiments of the present disclosure, in the operation of sensing the misalignment, the misalignment may be determined when a corresponding charging power source is supplied with maximum possible current for at least a specific time in each of the charging mode.

According to the various embodiments of the present disclosure, in the operation of determining full charging, it may be determined as the full charging when a battery charging complete signal is received from the external device.

According to the various embodiments of the present disclosure, in the operation of determining full charging, it may be determined as the full charging when a charging power source transmitted wirelessly to the external device is decreased for a specific time.

According to the various embodiments of the present disclosure, the basic charging mode may be performed if a charging time in the high-power charging mode is a time which is set to the basic charging mode.

According to the various embodiments of the present disclosure, if the heating temperature in the high-power charging mode is higher than a high-power charging limit temperature, the basic charging mode may be performed by stopping the high-power charging mode.

Hereinafter, an internal structure of a wireless charging device (e.g., the electronic device 201) and a cooling structure thereof according to various embodiments of the present disclosure will be described with reference to the accompanying drawings.

Figure 7:
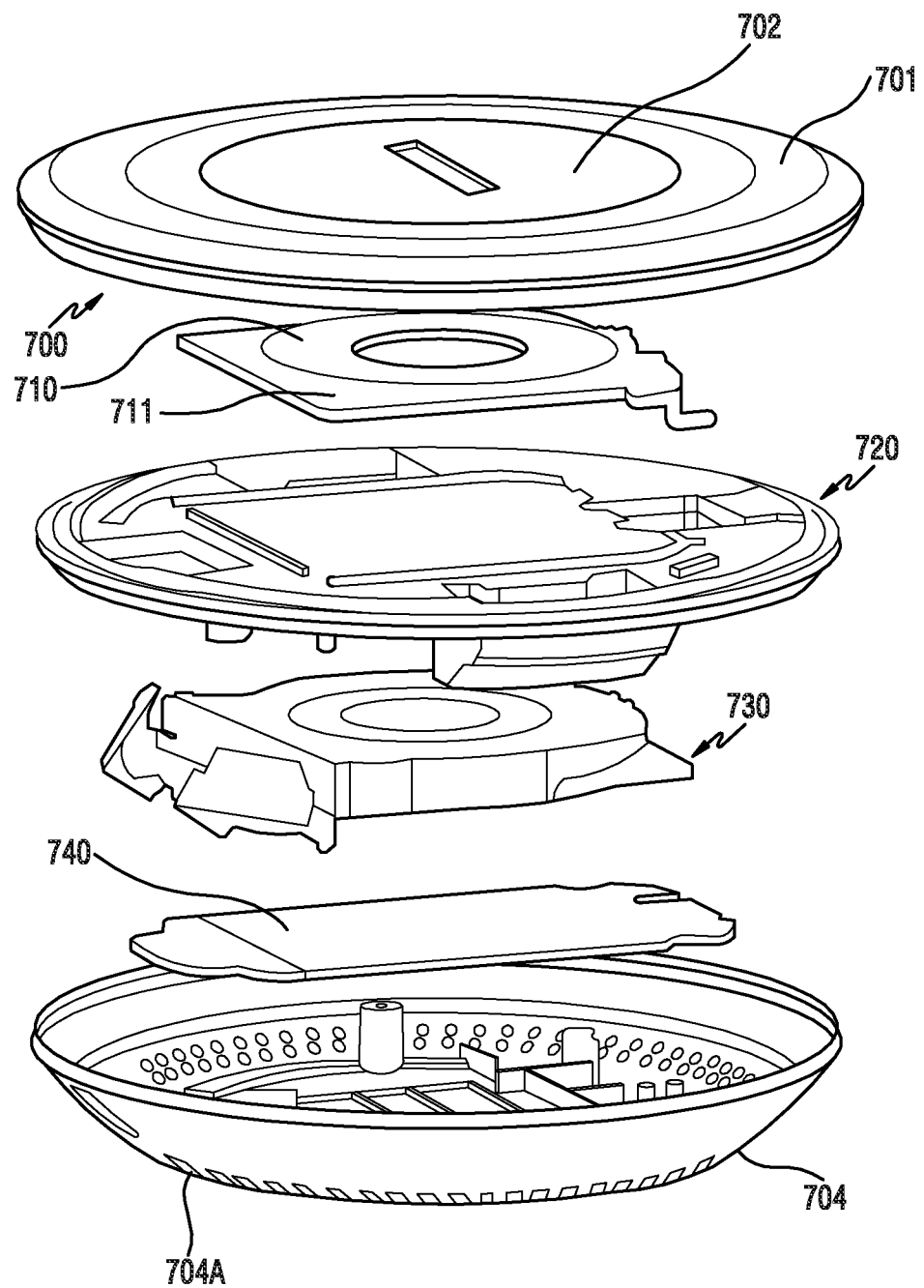
FIG. 7 is an exploded perspective view illustrating a structure of a wireless charging device according to various embodiments of the present disclosure.

FIG. 7 is an exploded perspective view illustrating a structure of a wireless charging device according to various embodiments of the present disclosure.

Referring to FIG. 7, a wireless charging device 700 according to the various embodiments may be a wireless charging device which can be configured roughly in a pad shape so that an external device is placed thereon.

The wireless charging device according to the various embodiments may include one or more heat generators 710 and 740 and at least one air circulation generation member 730, e.g., a fan, for transferring generated heat to the outside. The wireless charging device according to the various embodiments may be a device on which an external device is placed to charge the external device in a wireless manner through a mutual operation with the wireless charging device.

The wireless charging device according to the various embodiments may include the first and second heat generators 710 and 740 and the air circulation generation member 730 (also referred to as a fan or an air circulation generation device). According to the various embodiments, the air circulation generation member 730 may be called a cooling device for performing a function of decreasing a temperature of the first and second heat generators 710 and 740, and may be called a heat emitting device or an air circulation device since air including heat is emitted to the outside. The air circulation generation member 730 may be disposed between the first and second heat generators 710 and 740. For example, the air circulation generation member 730 may be disposed in an up-and-down laminated structure with respect to the first and second heat generators 710 and 740. The laminated structure may include the first heat generator 710, the air circulation generation member 730, and the second heat generator 740 from upward to downward. For another example, the wireless charging device may include a housing, and the housing may include a first surface and a second surface facing the first surface in an opposite direction. For another example, the first surface may be an outer surface which is raised by the electronic device, and the second surface may be a bottom surface. For another example, in the wireless charging device, the first heat generator 710 may be disposed in parallel and in proximity to the first surface of the housing, the air circulation generation member 730 may be disposed below the first heat generator 710, and the second heat generator 740 may be disposed below the air circulation generation member 730.

According to the various embodiments, the air circulation generation member 730 may be disposed between the first heat generator 710 and the second heat generator 740. The air circulation generation member 730 may cool each of the first heat generator 710 and the second heat generator 740, and may play a role of emitting heat generated from each of the first heat generator 710 and the second heat generator 740 to outside the housing.

According to the various embodiments, the first heat generator 710 may be a coil (a transmission coil), and the second heat generator 740 may be a PBA.

According to the various embodiments, the air circulation generation member 730 may include an air flow fan. According to the various embodiments, the wireless charging device may include the first heat generator 710, the air circulation generation member 730, and the second heat generator 740.

According to the various embodiments of the present disclosure, the housing may be a supporter (a supporting construction) which structurally supports the air circulation generation member 730 and the second heat generator 740, which protects the aforementioned components, and which is formed of an injection material serving for an external design.

According to the various embodiments, the housing may include an upper housing 702 and a lower housing 704. The upper and lower housings 702 and 704 may be coupled in a vertical direction to provide a pad-type exterior.

According to the various embodiments, the upper housing 702 may have a flat surface in an upper portion thereof so that an electronic device having a reception coil is placed thereon. Further, the upper housing 702 may have a rubber pad which may generate frictional force with respect to the external device placed thereon and which is mounted on a groove of the rubber pad 701. The rubber pad may prevent a movement of the electronic device placed thereon due to the frictional force with respect to the electronic device. The rubber pad 701 may be constructed in a shape similar to that of the first heat generator 710. For example, the rubber pad may be constructed to have a ring shape. According to the various embodiments, an outer surface of the rubber pad may be disposed to the upper surface of the housing in an exposed manner, and may be disposed in parallel.

According to the various embodiments, the first heat generator 710 is a first heat generator in which heat is generated during the operation, and may be the coil 230 of FIG. 2. According to the various embodiments, the coil may deliver power to the coil of the external device (not shown) by using an electromagnetic induction phenomenon.

According to the various embodiments, a shield member 711 may be disposed below the first heat generator 710. The shield member 711 may protect other electrical elements (e.g., a PBA 740, an air circulation generation member 730, or the like) from an electromagnetic field generated when power is transmitted to a reception coil, and may increase efficiency of wireless power transmission.

According to the various embodiments, the housing may include a supporter, e.g., a bracket 720, for supporting the first heat generator 710 and the shield member 711, for fixing the air circulation generation member 730, and for providing a duct structure of the air circulation generation member 730. According to the various embodiments, a duct included in the bracket 720 may be an inner injection construction for inducing an air flow. For example, the bracket 720 may form at least one hole to a portion of a surface which is in contact with the shield member 711 so that the air flow has an effect on the shield member 711 and the first heat generator 710 (the heat generator). For example, the housing forms at least one vent hole 704A to an outer surface of the lower housing 704, and thus may be a passage through which air including internal heat of the device exits via the at least one vent hole 704A and/or a passage through which an external air can enter.

According to the various embodiments, the air circulation generation member 730 may be placed to generate an air flow between the second heat generator 740 (i.e., the heat generator) and the first heat generator 710 (i.e., the heat generator). For example, the air circulation generation member 730 includes an air flow fan, and whether to drive the air circulation generation member (hereinafter, referred to as a fan) may be determined by a control circuit (not shown). For example, the air circulation generation member 730 may be placed to face the first heat generator 710 in an up-and-down laminated structure, and may be placed to face the second heat generator 740 in the up-and-down laminated structure.

According to the various embodiments, the first heat generator 710 and/or the shield member 711 may have a (circular shaped or ring shaped) center, and the air circulation generation member 730 may also have a rotation center of the fan. For example, the first heat generator 710, the shield member 711, and the air circulation generation member 730 may be disposed along the same axis. For another example, the air circulation generation member 730 may be placed to be separated from the shield member 711, and may be placed to be separated from the second heat generator 740. For example, the air circulation generation member 730 may have a gap formed with each of the shield member 711 and the second heat generator 740, and the gap may be an air movement passage. Air including heat generated through the gap may be emitted outside the housing by the use of the air circulation generation member 730.

Figure 8:
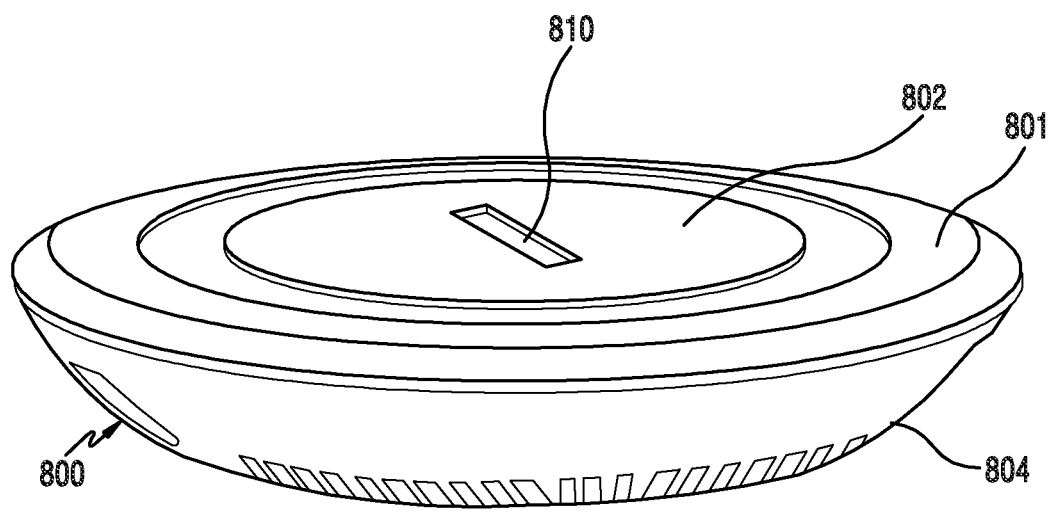
FIG. 8 is an assembled perspective view illustrating an outer appearance of a wireless charging device according to various embodiments of the present disclosure.

FIG. 8 is an assembled perspective view illustrating an outer appearance of a wireless charging device according to various embodiments of the present disclosure.

Referring to FIG. 8, a wireless charging device 800 according to the various embodiments may form the outer appearance by coupling of an upper housing 820 and a lower housing 804. The outer appearance of the wireless charging device according to the various embodiments is not limited to a circular shape when viewed from the top. When the outer appearance of the wireless charging device 800 is viewed from the top, a logo or the like may be indicated in a center 810.

According to the various embodiments, the upper housing 802 may further have a rubber pad in a groove 801 formed on an outer surface. The rubber pad may be constructed of a ring shape similar to a coil. The rubber pad may be an indicator for aligning the electronic device to the center by using color different from color of the upper housing 802.

Figure 9:
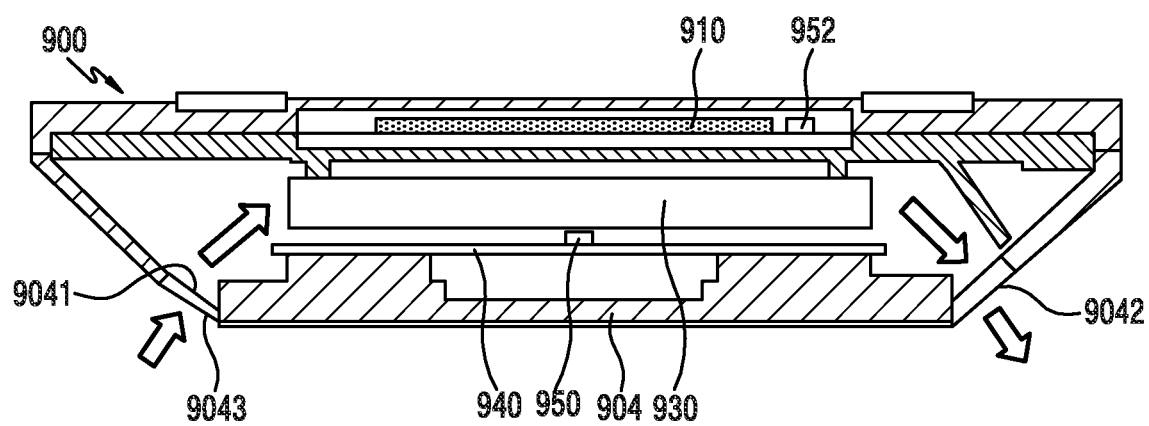
FIG. 9 is a cross-sectional view briefly illustrating a structure of a wireless charging device according to various embodiments of the present disclosure.

FIG. 9 is a cross-sectional view briefly illustrating a structure of a wireless charging device according to various embodiments of the present disclosure.

Referring to FIG. 9, a wireless charging device 900 according to the various embodiments may include a PBA 940, and the PBA may include a wireless charging circuit. According to the various embodiments, the PBA 940 may be placed below a fan 930 facing thereto. According to the various embodiments, the fan 930 may be the air circulation generation member 250 of FIG. 2.

According to the various embodiments, the fan 930 is disposed on the PBA 940 to have a specific gap (to be separated) instead of being placed in contact with a board, and may be constructed to emit heat generated in the PBA 940 to the outside.

According to the various embodiments, a lower housing 904 has a flat surface so as to be placed on the floor, and may have one or more vent holes 9041 and 9042 through which air enters from the outside and through which the air exits to the outside. According to another example, the vent hole 9041 may further have a mesh 9043 for preventing an external foreign material from entering (e.g., mesh processing). According to an embodiment, one or more of vent holes 9041 and 9042 may be formed to an entrance portion of the housing, and one or more of them may be formed to an exit portion thereof. For example, air flows through the vent hole 9041 located in the entrance portion by the operation of the fan 930, and air including generated heat may be emitted through the vent hole 9042 located in the exit portion.

In the wireless charging device according to the various embodiments, one or more temperature sensors 950 and 952 for detecting a heating temperature may be disposed, and the temperature sensor may be disposed in proximity to the heat generator. According to the various embodiments, the one or more temperature sensors 950 and 952 may be mounted on the PBA 940 or in proximity to the coil 910 or at least a portion of the PBA 940 and/or the coil 910. For example, a thermistor may be used as the temperature sensors 950 and 952.

Figure 10:
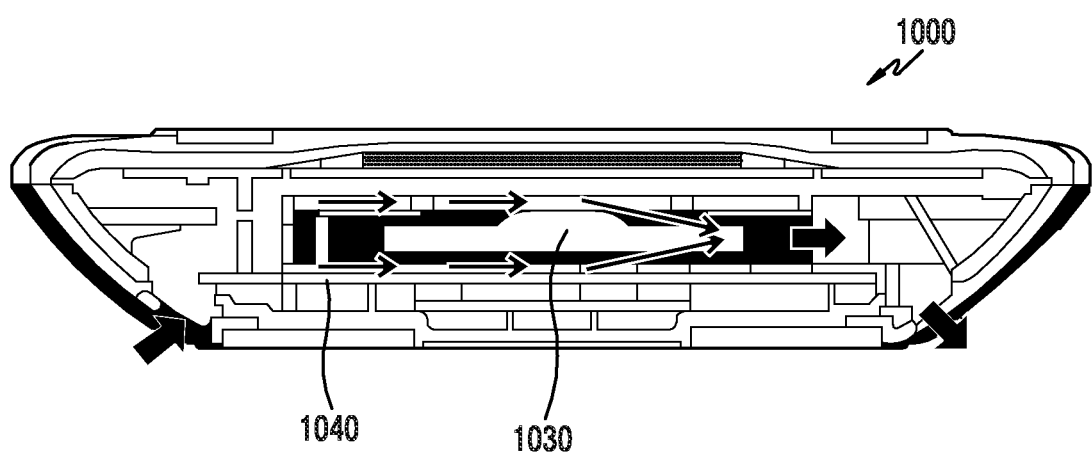
FIG. 10 is a cross-sectional view illustrating a structure of a wireless charging device according to various embodiments of the present disclosure.

FIG. 10 is a cross-sectional view illustrating a structure of a wireless charging device according to various embodiments of the present disclosure.

Referring to FIG. 10, a PBA 1040 of a wireless charging device 1000 may be disposed to a lower portion of a housing, and may be disposed to overlap with a fan 1030 with a gap. According to the various embodiments, the PBA 1040 may include a power source supply device and a wireless charging circuit. According to the various embodiments, the wireless charging circuit may include at least one of an I/F, a control circuit, an I/F control, and a DC-AC inverter. According to the various embodiments, a TA may supply a power source to the wireless charging circuit. According to the various embodiments, the I/F may be a connection path to be connected with the TA. According to the various embodiments, the control circuit may control wireless charging. According to the various embodiments, the I/F control may be a communication I/F for confirming whether a voltage change of the TA is supported. According to the various embodiments, the DC-AC inverter may switch a DC power source of the TA to change to AC power.

According to the various embodiments of the present disclosure, referring to Table 2 below, it is shown an example of cooling each of a front surface and rear surface of the wireless charging device by the air circulation generation member. It can be seen that each of the front surface and rear surface of a coil (a transmission coil (TX coil)) in the air circulation generation member is cooled.

TABLE 2

| FAN operation | X | O |
|---|---|---|
| A front surface of the Pad | 40.7° C. | 37.3° C. (3.4° C.↓) |
| A rear surface of the Pad | 44.7° C. | 40.3° C. (4.4° C.↓) |
| A pad front surface of the TX coil | 45.5° C. | 38.3° C. (7.2° C.↓) |
| A pad rear surface of the TX coil | 49.5° C. | 44.0° C. |

Figure 11:
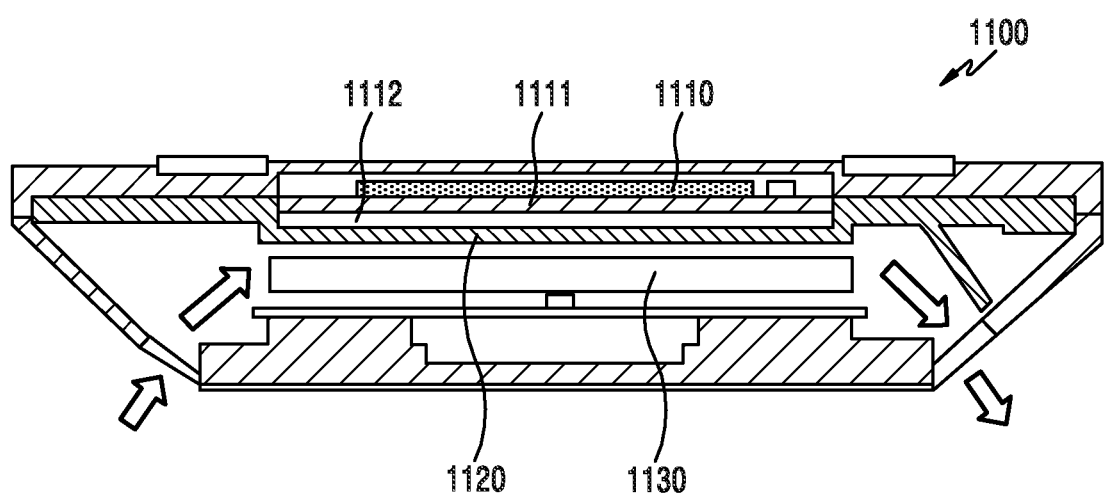
FIG. 11 is a cross-sectional view illustrating a state where a coil is mounted according to various embodiments of the present disclosure.

FIG. 11 is a cross-sectional view of a wireless charging device according to various embodiments of the present disclosure.

Referring to FIG. 11, a wireless charging device 1100 according to the various embodiments of the present disclosure may include a coil 1110, and may include a shield member 1111 and/or heat radiation member 1112 below the coil 1110. According to the various embodiments, the shield member 1111 may be disposed below the coil 1110. The shield member 1111 may protect other electrical elements (e.g., a PBA, a fan, or the like) from an electromagnetic field generated when power is transmitted to an external device, and may increase efficiency of wireless power transmission.

According to the various embodiments, as a heat generator, the coil 1110 may deliver generated heat towards a fan 1130 and a bracket 1120 by using the heat radiation member 1112. The generated heat may be emitted to the outside by the fan 1130. According to the various embodiments, the heat radiation member 1112 may include an aluminum-based, or copper-based, or silicon-based material having a higher heat transfer rate. For example, the heat radiation member 1112 may be disposed along the same axis as the coil 1110 and/or the shield member 1111, and may be attached below the shield member 1111. According to another example, a lower surface of the heat radiation member 1112 may be disposed to face an upper portion of the fan 1130 with a specific gap, or may be disposed in proximity to the bracket 1120. The heat generated through the heat radiation member 1112 may be emitted to an exit vent hole by the operation of the fan in the upper portion of the fan 1130.

Figure 12:
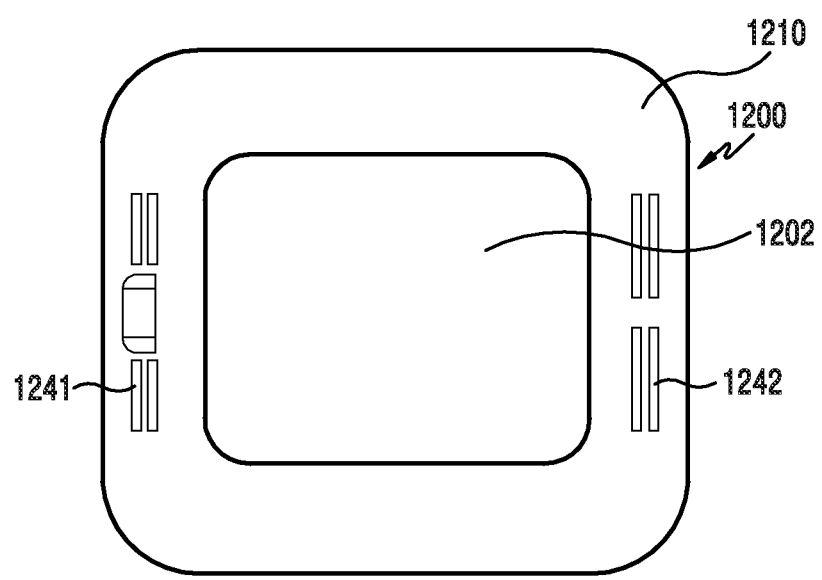
FIG. 12 is a plan view illustrating an outer appearance of a wireless charging device according to various embodiments of the present disclosure.

FIG. 12 is a rear view illustrating an outer appearance of a wireless charging device 1200 according to various embodiments of the present disclosure.

Referring to FIG. 12, the wireless charging device 1200 according to the various embodiments may roughly have a square shape when viewed from the bottom, and a member 1202 formed of a rubber material may be attached to a lower bottom portion. For example, the wireless charging device 1200 may include the member 1202 to prevent slipping from a desktop or the like.

The wireless charging device 1200 according to the various embodiments may have one or more vent holes 1241 and 1242 in a lateral surface 1210.

Figure 13A:
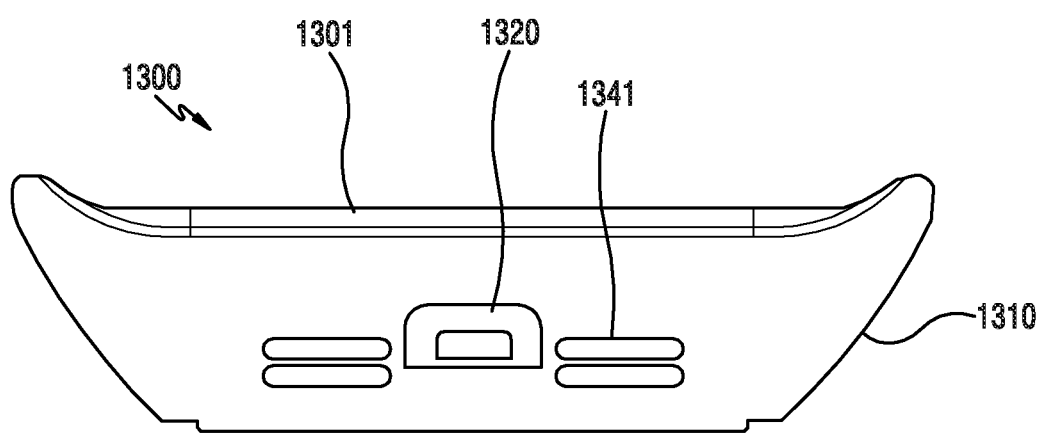
FIG. 13A is one later view illustrating an outer appearance of a wireless charging device according to various embodiments of the present disclosure.
Figure 13B:
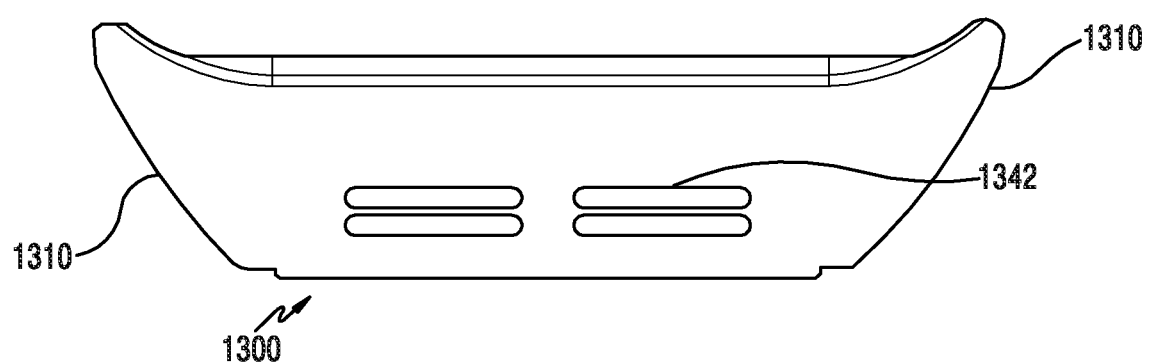
FIG. 13B is another later view illustrating an outer appearance of a wireless charging device according to various embodiments of the present disclosure.

FIG. 13A is one later view illustrating an outer appearance of a wireless charging device 1300 according to various embodiments of the present disclosure, and FIG. 13B is another later view illustrating an outer appearance of a wireless charging device according to various embodiments of the present disclosure.

Referring to FIGS. 13A and 13B, the wireless charging device 1300 according to the various embodiments may roughly have a square shape when viewed from the top, and may have four lateral surfaces 1310. The wireless charging device 1300 according to the various embodiments may include a flat portion in upper and lower surfaces thereof. An upper surface 1301 may be a place on which an electronic device for charging is placed.

According to the various embodiments, at least one entrance vent hole 1341 may be provided to one first lateral surface 1310. Each of the vent holes 1341 may be formed with a gap.

According to the various embodiments, a charging connector 1320 capable of supplying a power source may be disposed between the respective vent holes 1341. For another example, at least one exit vent hole 1342 may be provided to the second lateral surface 1310 facing the first lateral surface in an opposite direction. Each of the respective vent holes 1342 may be disposed with a specific gap.

According to the various embodiments, air which enters through the at least one entrance vent hole 1341 may be emitted to the at least one exit vent hole 1341 in the opposite direction. The entrance vent hole 1341 may have more mesh-shaped elements.

The wireless charging device according to the various embodiments is not necessarily limited such that entrance and exit vent holes are formed to lateral surfaces facing each other. For example, the wireless charging device according to the various embodiments may form vent holes in all lateral surfaces.

Figure 14:
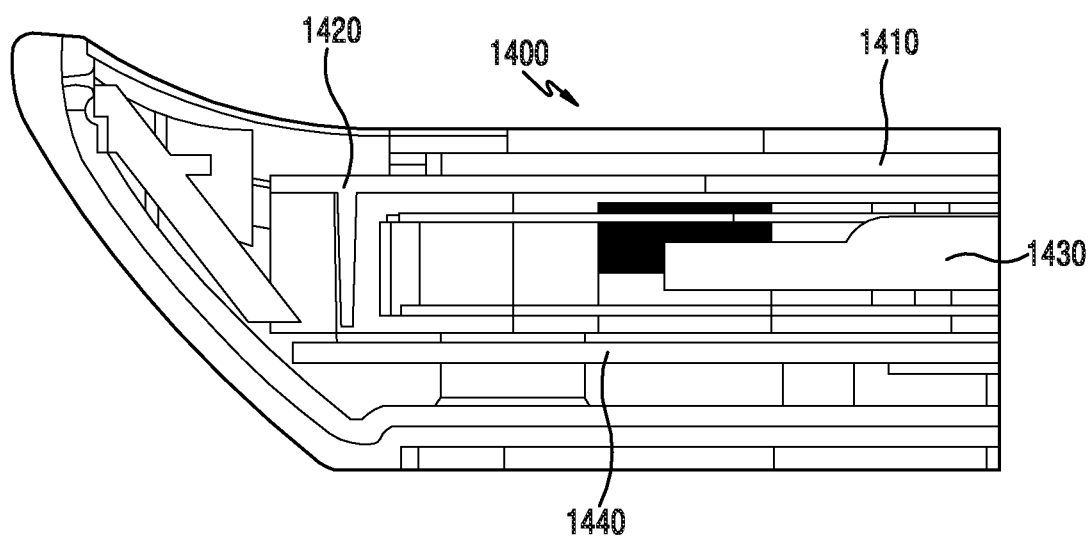
FIG. 14 is a cross-sectional view illustrating one portion of an inner structure of a wireless charging device according to various embodiments of the present disclosure.

FIG. 14 is a cross-sectional view illustrating one portion of an inner structure of a wireless charging device 1400 according to various embodiments of the present disclosure.

Referring to FIG. 14, the wireless charging device 1400 according to the various embodiments may include first and second heat generators 1410 and 1440, an air circulation generation member 1430, and a bracket 1420. The air circulation generation member 1430 may be disposed between the first and second heat generators 1410 and 1440 in a laminated shape. For example, the air circulation generation member 1430 may be disposed in parallel to the first and second heat generators 1410 and 1440 in an up-and-down laminated structure.

According to the various embodiments, as an internal supporting construction for supporting the first and second heat generators 1410 and 1440 and the air circulation generation member 1430, the bracket 1420 may be constructed of an insulation material, a metallic material, or a combination thereof. The bracket 1420 has a relatively lower temperature than the first and second heat generators 1410 and 1440, and thus may additionally serve for a heat radiation function for delivering heat generated in the first and second heat generators 1410 and 1440 to the outside.

Figure 15:
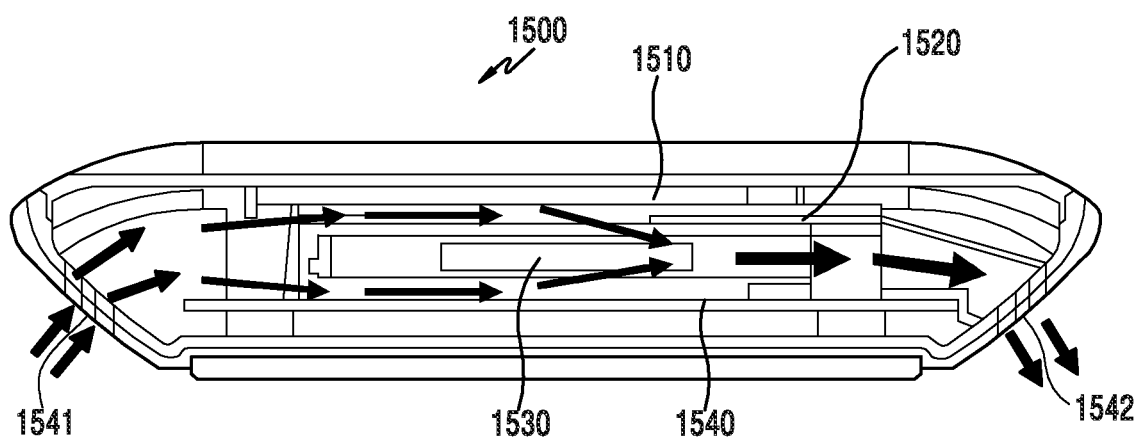
FIG. 15 is a cross-sectional view illustrating an internal structure of a wireless charging device according to various embodiments of the present disclosure.

FIG. 15 is a cross-sectional view illustrating an air flow using an air circulation generation member included in a wireless charging device according to various embodiments of the present disclosure.

Referring to FIG. 15, a wireless charging device 1500 according to the various embodiments may have an air circulation generation member 1530 disposed between first and second heat generators 1510 and 1540. Further, at least one entrance vent hole 1541 may be formed to one side of the wireless charging device 1500, and at least one exit vent hole 1542 may be formed to the other side facing the one side.

According to the various embodiments, if the air circulation generation member 1530 operates, air which enters through the entrance vent hole 1541 due to a pressure difference may be emitted to the outside through the exit vent hole 1542 via the air circulation generation member 1530. The entered air may be emitted to the outside by absorbing heat of the first and second heat generators 1510 and 1540 by the air circulation generation member 1530.

According to the various embodiments, the air circulation generation member 1530 may be constructed such that an upper surface thereof has a first gap with respect to a bracket 1520 and that a lower surface thereof has a second gap with respect to a PBA. The first and second gaps may be an air passage. The first and second gaps may be a space in which heat generated by the first and second heat generators 1510 and 1540 is concentrated. For example, concentrated heat in the first and second gaps may move in an arrow direction and then may be emitted by the air circulation generation member 1530 to the outside.

Figure 16:
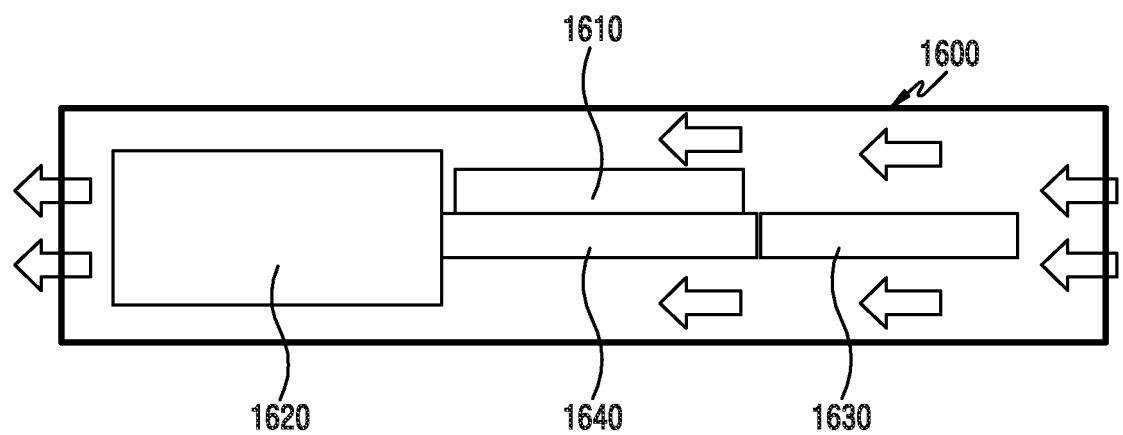
FIG. 16 is a cross-sectional view briefly illustrating a structure of a wireless charging device according to various embodiments of the present disclosure.

FIG. 16 is a cross-sectional view briefly illustrating a structure of a wireless charging device 1600 according to various embodiments of the present disclosure.

Referring to FIG. 16, the wireless charging device 1600 according to the various embodiments of the present disclosure may include first and second heat generation units 1610 and 1630 and an air circulation generation member 1620, and the air circulation generation member 1620 may be disposed to one side of the first and second heat generation units 1610 and 1630. The air circulation generation member 1620 may be disposed in parallel without being laminated with respect to the first and second heat generation units 1610 and 1630. For example, the disposition structure may be a structure in which the air circulation generation member 1620, the first heat generator 1610, and the second heat generator 1630 are disposed in parallel to each other without overlapping with each other. The air circulation generation member 1620 may be disposed to one end of the wireless charging device 1600. The first heat generator 1610 may be disposed to one side of the air circulation generation member 1620. The second heat generator 1630 may be disposed to one side of the first heat generator 1610. The first heat generator 1610 may be disposed on a shield member 1640. Positions at which the first and second heat generation units 1610 and 1630 are disposed may change with each other. The second heat generator may be located in the position of the first heat generator, and the first heat generator may be located in the position of the second heat generator.

According to the various embodiments, the air circulation generation member 1620 may play a role of cooling each of the first heat generator 1610 and the second heat generator 1630, and of emitting heat generated in each of the first heat generator 1610 and the second heat generator 1630 to the outside a housing. A thick arrow indicates an air flow.

Figure 17:
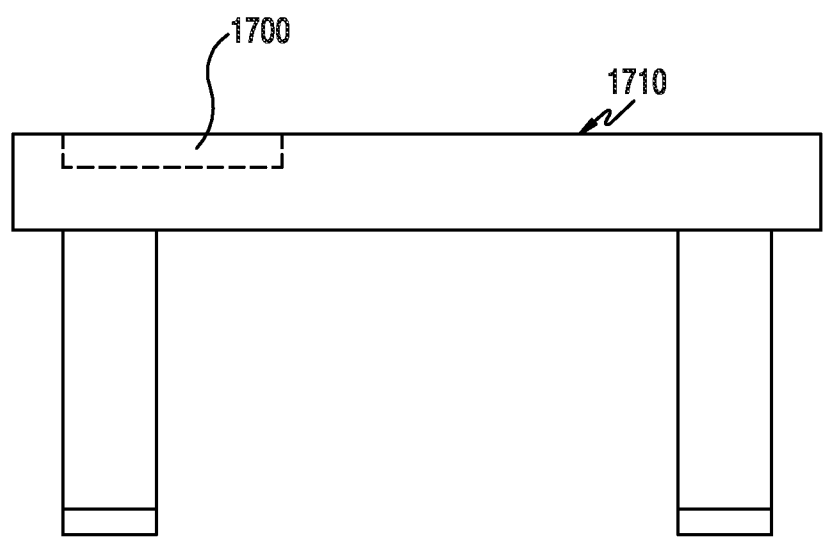
FIG. 17 illustrates an example of a state in which a wireless charging device is mounted on furniture according to various embodiments of the present disclosure.

FIG. 17 illustrates an example of a state in which a wireless charging device is mounted on furniture according to various embodiments of the present disclosure.

Referring to FIG. 17, a wireless charging device 1700 according to the various embodiments may be mounted on furniture 1710 in an integral or separated manner. According to the various embodiments, the furniture 1710 may include a desk, a table, a dressing table, a conference table (a side table), or the like.

Further, the wireless charging device according to the various embodiments may be mounted on a transportation means in an integral or separated manner. According to the various embodiments, the transportation means may include a car, a subway, an airplane, a train, a bus, or the like.

Hereinafter, an electronic device according to various embodiments will be described with reference to the accompanying drawings. In the present document, the term 'user' may refer to a person who uses the electronic device or a device (e.g., an artificial intelligence (AI) electronic device) which uses the electronic device.

Figure 18:
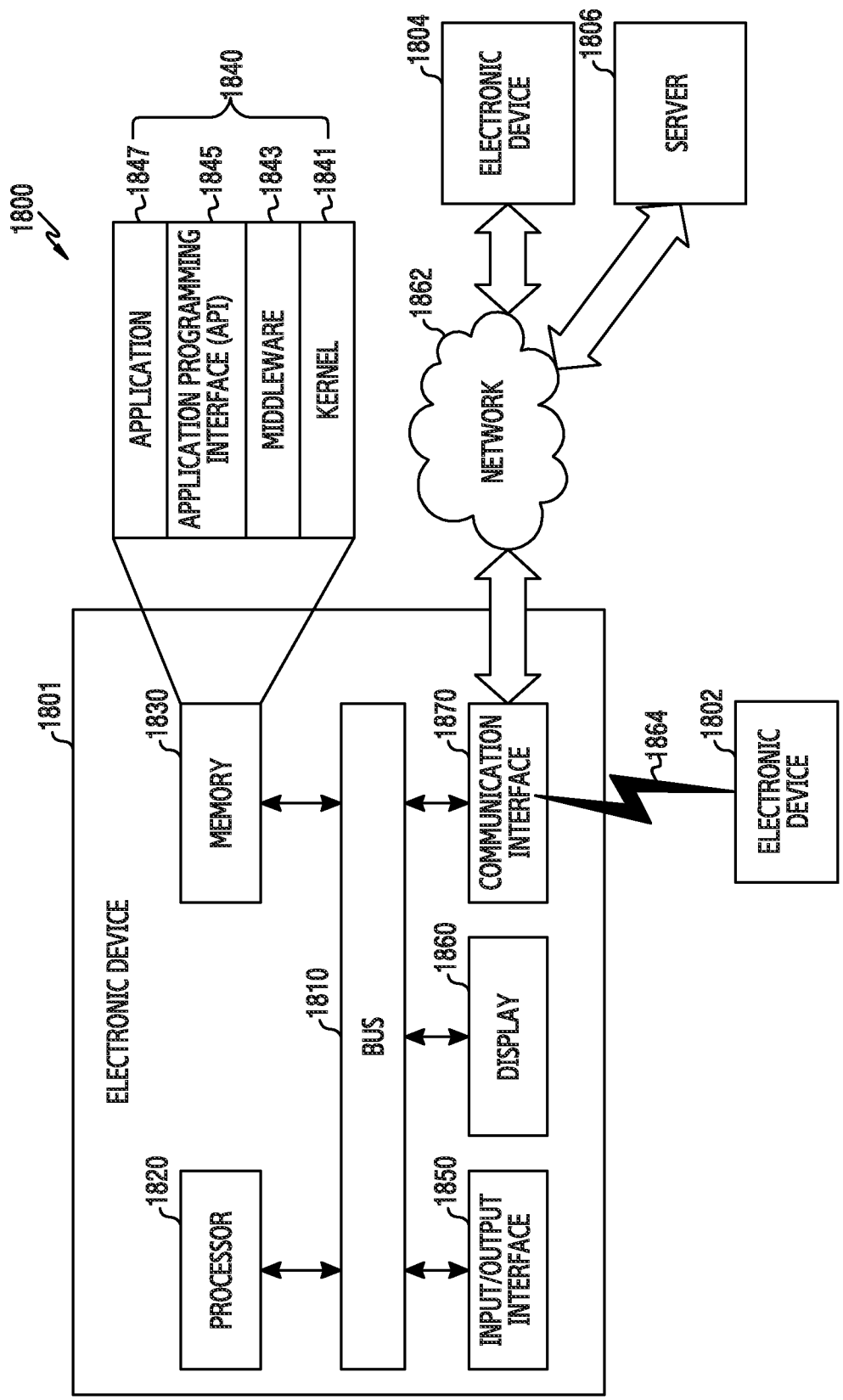
FIG. 18 illustrates an electronic device in a network environment according to various embodiments of the present disclosure.

FIG. 18 illustrates an electronic device in a network environment 1800 according to various embodiments of the present disclosure.

Referring to FIG. 18, an electronic device 1801 includes at least one of a bus 1810, a processor 1820, a memory 1830, an input/output interface 1850, a display 1860, and a communication interface 1870. According to the present disclosure, at least one of the components of the electronic device 1801 may be omitted, or other components may be additionally included in the electronic device 1801.

The bus 1810 is a circuit that interconnects the aforementioned elements and transmits communication signals (e.g., control messages) between the aforementioned elements.

The processor (ex: control circuit) 1820 may include at least one of a central processing unit (CPU), an application processor (AP), and a communication processor (CP). The processor 1820 carries out operations or data processing related to control and/or communication of at least one other component of the electronic device 1801.

The memory 1830 stores commands or data (e.g., a reference pattern or a reference touch area) associated with one or more other components of the electronic device 1801. According to one embodiment, the memory 1830 stores software and/or a program 1840. For example, the program 1840 includes a kernel 1841, a middleware 1843, an application programming interface (API) 1845, an application program 1847, or the like, with one or more of the kernel 1841, the middleware 1843, and the API 1845 being referred to as an operating system (OS).

The kernel 1841 controls or manages system resources (e.g., the bus 1810, the processor 1820, or the memory 1830) used for performing an operation or function implemented by the other programs (e.g., the middleware 1843, the API 1845, or the application program 1847). Furthermore, the kernel 1841 provides an interface through which the middleware 1843, the API 1845, or the application program 1847 may access the individual elements of the electronic device 1801 to control or manage the system resources.

The middleware 1843, for example, functions as an intermediary for allowing the API 1845 or the application program 1847 to communicate with the kernel 1841 to exchange data. In addition, the middleware 1843 processes one or more task requests received from the application program 1847 according to priorities thereof. For example, the middleware 1843 assigns priorities for using the system resources (e.g., the bus 1810, the processor 1820, the memory 1830, or the like) of the electronic device 1801, to at least one application of the application program 1847. For example, the middleware 1843 performs scheduling or loading balancing on the one or more task requests by processing the one or more task requests according to the priorities assigned thereto.

The API 1845 is an interface through which the application 1847 controls functions provided from the kernel 1841 or the middleware 1843, and may include, for example, at least one interface or function (e.g., instruction) for file control, window control, image processing, or text control.

The input/output interface 1850 forwards instructions or data input from a user through an input/output device (e.g., various sensors, such as an acceleration sensor or a gyro sensor, and/or a device such as a keyboard or a touch screen), to the processor 1820, the memory 1830, or the communication interface 1870 through the bus 1810. For example, the input/output interface 1850 provides the processor 1820 with data on a user' touch entered on a touch screen. Furthermore, the input/output interface 1850 outputs instructions or data, received from, for example, the processor 1820, the memory 1830, or the communication interface 1870 via the bus 1810, through an output unit (e.g., a speaker or the display 1860).

The display 1860 includes, for example, a liquid crystal display (LCD), a light emitting diode (LED) display, an organic LED (OLED) display, a micro electro mechanical system (MEMS) display, an electronic paper display, and the like. The display 1860, for example, displays various types of content (e.g., a text, images, videos, icons, symbols, and the like) for the user. The display 1860 may include a touch screen and receive, for example, a touch, a gesture, proximity, a hovering input, and the like, using an electronic pen or the user's body part.

The communication interface 1870, for example, sets communication between the electronic device 1801 and an external device (e.g., a first external electronic device 1802, a second external electronic device 1804, or a server 1806). For example, the communication interface 1870 connects to a network 1862 through wireless or wired communication to communicate with the external device (e.g., the second external electronic device 1804 or the server 1806).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, a short range communication 1864. The short-range communication 1864 may include at least one of, for example, Wi-Fi, Bluetooth™ (BT), near field communication (NFC), and a global navigation satellite system (GNSS). For example, the GNSS may include at least one of, for example, a GPS, a global navigation satellite system (GLONASS), a BeiDou navigation satellite system (hereinafter, referred to as "BeiDou"), and European global satellite-based navigation system (Galileo). Hereinafter, in an embodiment of the present disclosure, the "GPS" may be interchangeably used with the "GNSS." The wired communication may include, for example, at least one of a universal serial bus (USB), a high definition multimedia interface (HDMI), recommended standard 232 (RS-232), and a plain old telephone service (POTS). The network 1862 may include at least one of a communication network, such as a computer network (e.g., a local area network (LAN) or a wide area network (WAN)), the internet, and a telephone network.

Each of the first external electronic device 1802 and the second external electronic device 1804 may be a device which is the same as or different from the electronic device 1801. According to an embodiment of the present disclosure, the server 1806 may include a group of one or more servers. According to the present disclosure, all or a part of operations performed in the electronic device 1801 can be performed in the other electronic device or multiple electronic devices (e.g., the first external electronic device 1802 or the second external electronic device 1804 or the server 106).

According to an embodiment of the present disclosure, when the electronic device 1801 should perform some functions or services automatically or by a request, the electronic device 1801 may make a request for performing at least some functions related to the functions or services by another device (e.g., the first external electronic device 1802, the second external electronic device 1804, or the server 1806) instead of performing the functions or services by itself. The first external electronic device 1802, the second external electronic device 1804, or the server 1806 may perform a function requested from the electronic device 1801 or an additional function and transfer the performed result to the electronic device 1801. The electronic device 1801 can provide the requested function or service to another electronic device by processing the received result as it is or additionally. To this end, for example, cloud computing, distributed computing, or client-server computing technology may be used.

Figure 19:
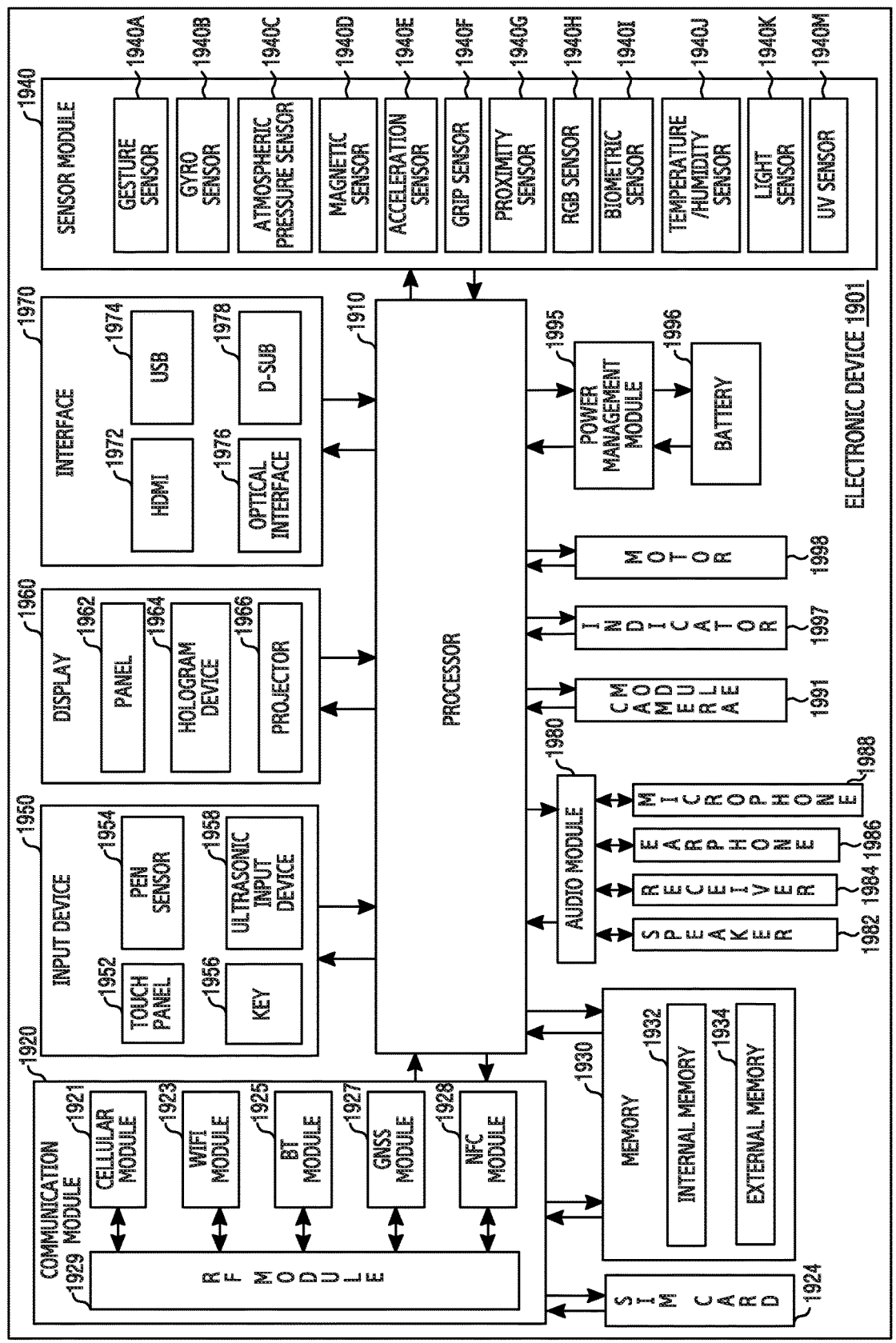
FIG. 19 is a block diagram of an electronic device according to various embodiments of the present disclosure.

FIG. 19 is a block diagram of an electronic device 1901 according to various embodiments of the present disclosure.

Referring to FIG. 19, for example, an electronic device 1901 may include the whole or part of the electronic device 1801 illustrated in FIG. 18. The electronic device 1901 may include at least one AP 1910, a communication module 1920, a subscriber identification module (SIM) card 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may control a plurality of hardware or software components connected to the processor 1910 by driving an OS or an application program and perform processing of various pieces of data and calculations. The processor 1910 may be implemented by, for example, a system on chip (SoC). According to an embodiment of the present disclosure, the processor 1910 may further include a graphics processing unit (GPU) and/or an image signal processor (ISP). The processor 1910 may include at least some (e.g., a cellular module 1921) of the elements illustrated in FIG. 19. The processor 1910 may load, into a volatile memory, instructions or data received from at least one (e.g., a non-volatile memory) of the other elements and may process the loaded instructions or data, and may store various data in a non-volatile memory.

The communication module 1920 may have a configuration equal or similar to that of the communication interface 1870 of FIG. 18. The communication module 1920 may include, for example, the cellular module 1921, a Wi-Fi module 1923, a BT module 1925, a GNSS module 1927 (e.g., a GPS module, a GLONASS module, a BeiDou module, or a Galileo module), an NFC module 1928, and a radio frequency (RF) module 1929.

The cellular module 1921 may provide a voice call, image call, a text message service, or an Internet service through, for example, a communication network. According to an embodiment of the present disclosure, the cellular module 1921 may distinguish between and authenticate electronic devices 1901 within a communication network using a SIM (e.g., the SIM card 1924). According to an embodiment of the present disclosure, the cellular module 1921 may perform at least some of the functions that the processor 1910 may provide. According to an embodiment of the present disclosure, the cellular module 1921 may include a CP.

Each of the Wi-Fi module 1923, the BT module 1925, the GNSS module 1927, and the NFC module 1928 may include, for example, a processor for processing data transmitted and received through the relevant module. According to various embodiments of the present disclosure, at least some (e.g., two or more) of the cellular module 1921, the Wi-Fi module 1923, the BT module 1925, the GNSS module 1927, and the NFC module 1928 may be included in one integrated chip (IC) or IC package.

The RF module 1929 may transmit/receive, for example, a communication signal (e.g., an RF signal). The RF module 1929 may include, for example, a transceiver, a power amp module (PAM), a frequency filter, a low noise amplifier (LNA), and/or an antenna. According to an embodiment of the present disclosure, at least one of the cellular module 1921, the Wi-Fi module 1923, the BT module 1925, the GNSS module 1927, or the NFC module 1928 may transmit and receive RF signals through a separate RF module(s).

The SIM 1924 may include, for example, a card including a subscriber identity module and/or an embedded SIM, and may contain unique identification information (e.g., an IC card identifier (ICCID)) or subscriber information (e.g., an international mobile subscriber identity (IMSI)).

The memory 1930 (e.g., the memory 1830) may include, for example, an internal memory 1932 or an external memory 1934. The internal memory 1932 may include at least one of, for example, a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard drive, or a solid state drive (SSD)).

An external memory 1934 may further include a flash drive, for example, a compact flash (CF), a secure digital (SD), a micro-SD, a mini-SD, an extreme digital (xD), a multi-media card (MMC), a memory stick, and the like. The external memory 1934 may be functionally and/or physically connected to the electronic device 1901 through various interfaces.

The sensor module 1940 may measure a physical quantity or detect an operation state of the electronic device 1901, and may convert the measured or detected information into an electrical signal. The sensor module 1940 may include, for example, at least one of a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (e.g., a red, green, blue (RGB) sensor), a biometric sensor 19401, a temperature/humidity sensor 1940J, a light sensor 1940K, and an ultraviolet (UV) sensor 1940M. Additionally or alternatively, the sensor module 1940 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling one or more sensors included therein. In various embodiments of the present disclosure, an electronic device 1901 may further include a processor configured to control the sensor module 1940 as a part of or separately from the processor 1910, and may control the sensor module 1940 while the processor 1910 is in a sleep state.

The input device 1950 may include, for example, a touch panel 1952, a (digital) pen sensor 1954, a key 1956, or an ultrasonic input device 1958. The touch panel 1952 may use at least one of, for example, a capacitive scheme, a resistive scheme, an IR scheme, and an ultrasonic scheme. In addition, the touch panel 1952 may further include a control circuit. The touch panel 1952 may further include a tactile layer and provide a tactile reaction to the user.

The (digital) pen sensor 1954 may include, for example, a recognition sheet which is a part of the touch panel or is separated from the touch panel. The key 1956 may include, for example, a physical button, an optical key, a keypad, and the like. The ultrasonic input device 1958 may detect ultrasonic wave generated by an input tool through a microphone (e.g., a microphone 1988) and identify data corresponding to the detected ultrasonic waves.

The display 1960 (e.g., the display 1860) may include a panel 1962, a hologram device 1964, or a projector 1966. The panel 1962 may include a configuration identical or similar to that of the display 1860 illustrated in FIG. 18. The panel 1962 may be implemented to be, for example, flexible, transparent, or wearable. The panel 1962 and the touch panel 1952 may be configured by one module. The hologram device 1964 may show a three dimensional image in the air by using an interference of light. The projector 1966 may display an image by projecting light onto a screen. The screen may be located, for example, inside or outside the electronic device 1901. According to an embodiment of the present disclosure, the display 1960 may further include a control circuit for controlling the panel 1962, the hologram device 1964, or the projector 1966.

The interface 1970 may include, for example, an HDMI 1972, a USB 1974, an optical interface 1976, or a D-sub-miniature (D-sub) 1978. The interface 1970 may be included in, for example, the communication interface 1870 illustrated in FIG. 18. Additionally or alternatively, the interface 1970 may include, for example, a mobile high-definition link (MHL) interface, an SD card/MMC interface, or an infrared data association (IrDA) standard interface.

The audio module 1980 may bilaterally convert, for example, a sound and an electrical signal. At least some elements of the audio module 1980 may be included in, for example, the input/output interface 1845 illustrated in FIG. 18. The audio module 1980 may process sound information which is input or output through, for example, a speaker 1982, a receiver 1984, earphones 1986, the microphone 1988, and the like.

The camera module 1991 is a device which may photograph a still image and a dynamic image. According to an embodiment of the present disclosure, the camera module 1991 may include one or more image sensors (e.g., a front sensor or a back sensor), a lens, an ISP or a flash (e.g., an LED or a xenon lamp).

The power management module 1995 may manage, for example, power of the electronic device 1901. According to an embodiment of the present disclosure, the power management module 1995 may include a power management IC (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like, and may further include additional circuits (e.g., a coil loop, a resonance circuit, a rectifier, and the like) for wireless charging. The battery gauge may measure, for example, a residual quantity of the battery 1996, and a voltage, a current, or a temperature during the charging. The battery 1996 may include, for example, a rechargeable battery or a solar battery.

The indicator 1997 may indicate a particular state (e.g., a booting state, a message state, a charging state, and the like) of the electronic device 1901 or a part (e.g., the processor 1910) of the electronic device 1901. The motor 1998 may convert an electrical signal into mechanical vibration, and may generate vibration, a haptic effect, and the like. Although not illustrated, the electronic device 1901 may include a processing unit (e.g., a GPU) for supporting a mobile TV. The processing unit for supporting mobile TV may, for example, process media data according to a certain standard, such as digital multimedia broadcasting (DMB), digital video broadcasting (DVB), or mediaFLO™.

Each of the components of the electronic device according to the present disclosure may be implemented by one or more components, and the name of the corresponding component may vary depending on the type of the electronic device. The electronic device according to various embodiments of the present disclosure may include at least one of the aforementioned elements. Some elements may be omitted or other additional elements may be further included in the electronic device. In addition, some of the hardware components according to various embodiments may be combined into one entity, which may perform functions identical to those of the relevant components before the combination.

Figure 20:
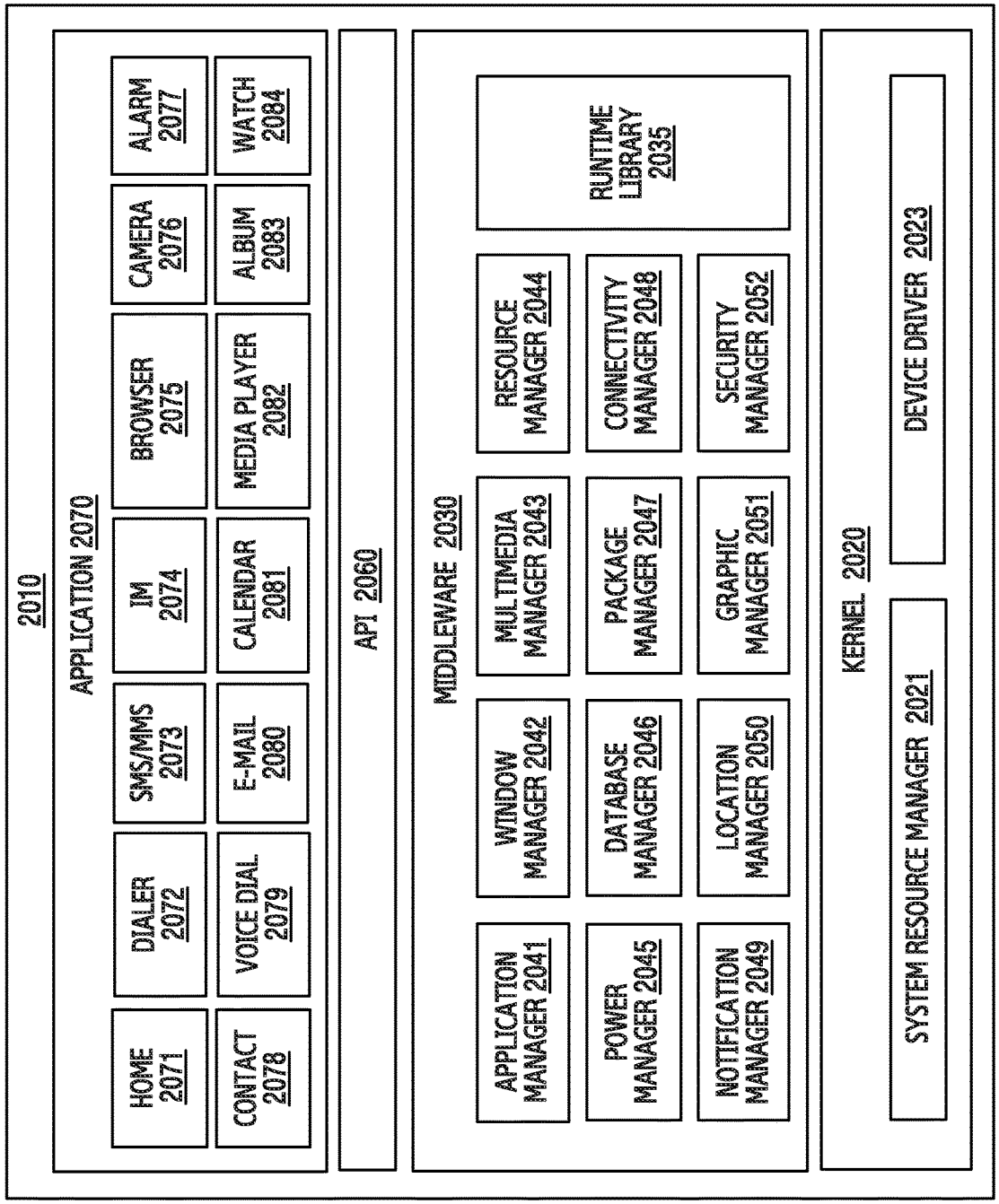
FIG. 20 is a block diagram of a program module according to various embodiments of the present disclosure.

FIG. 20 is a block diagram of a program module according to various embodiments of the present disclosure.

Referring to FIG. 20, according to an embodiment of the present disclosure, a program module 2010 (e.g., program 1840 of FIG. 18) includes an OS for controlling resources associated with an electronic apparatus (e.g., electronic device 1801 of FIG. 18) and/or various applications (e.g., an application program 1847 of FIG. 18) running on the operating system. The OS may be, for example, Android, iOS, Windows, Symbian, Tizen®, Bada, and the like.

The program module 2010 may include a kernel 2020, middleware 2030, an API 2060, and/or an application 2070. At least a part of the program module 2010 can be preloaded on the electronic device 1801 or downloaded from the external electronic device (e.g., the electronic devices 1802, 1804 or the server 1806).

The kernel 2020 (e.g., the kernel 1841 of FIG. 18) includes, for example, a system resource manager 2021 or a device driver 2023. The system resource manager 2021 may control, allocate, or collect the system resources. According to an embodiment of the present disclosure, the system resource manager 2021 includes a process management unit, a memory management unit, a file system management unit, and the like. The device driver 2023 includes, for example, a display driver, a camera driver, a BT driver, a shared-memory driver, a USB driver, a keypad driver, a Wi-Fi driver, an audio driver, an inter-process communication (IPC) driver, and the like.

The middleware 2030 provides, for example, a function commonly used by the application 2070 or provides various functions to the application 2070 through the API 2060, so that the application 2070 can efficiently use limited system resources within the electronic device. According to an embodiment of the present disclosure, the middleware 2030 (e.g., the middleware 1843 in FIG. 18) includes, for example, at least one of a runtime library 2035, an application manager 2041, a window manager 2042, a multimedia manager 2043, a resource manager 2044, a power manager 2045, a database manager 2046, a package manager 2047, a connection manager 2048, a notification manager 2049, a location manager 2050, a graphic manager 2051, and a security manager 2052.

The runtime library 2035 may include, for example, a library module that a compiler uses to add new functions through a programming language while the application 2070 is executed. The run time library 2035 may perform input/output management, memory management, or a function for an arithmetic function.

The application manager 2041 manages, for example, a life cycle of at least one applications of the application 2070. The window manager 2042 manages graphical user interface (GUI) resources used by a screen. The multimedia manager 2043 provides formats used for the reproduction of various media files, and performs encoding or decoding of the media file using a codec suitable for the corresponding format. The resource manager 2044 manages resources, such as a source code, a memory, and a storage space of at least one application of the application 2070.

The power manager 2045 operates together with a basic input/output system (BIOS) to manage a battery or power and may provide power information used for the operation of the electronic device. The database manager 2046 generates, searches for, or changes a database to be used by at least one application of the application 2070. The package manager 2047 manages the installation or the updating of applications distributed in the form of package file.

The connection manager 2048 manages wireless connection of, for example, Wi-Fi or BT. The notification manager 2049 provides a display or notification of an event, such as an arrival message, a promise, a proximity notification, and the like, in such a way that does not disturb a user. The location manager 2050 manages location information of the electronic device. The graphic manager 2051 manages graphic effects to be provided to a user and user interfaces related to the graphic effects. The security manager 2052 provides all security functions used for system security or user authentication. According to an embodiment of the present disclosure, when the electronic device (e.g., the electronic device 1801) has a telephone call function, the middleware 2030 may further include a telephony manager for managing a voice call function or a video call function of the electronic device.

The middleware 2030 includes a middleware module for forming a combination of various functions of the aforementioned components. The middleware 2030 provides modules specialized according to types of operating systems in order to provide differentiated functions. Further, the middleware 2030 dynamically removes some of the existing components or adds new components.

The API 2060 (e.g., the API 1845 of FIG. 18) is, for example, a set of API programming functions, and a different configuration thereof may be provided according to an operating system. For example, with respect to each platform, one API set may be provided in a case of Android or iOS, and two or more API sets may be provided in a case of Tizen.

The application 2070 (e.g., the application program 1847) includes, for example, one or more applications which can provide functions, such as a home function 2071, a dialer 2072, a short message service (SMS)/multimedia message service (MMS) 2073, an instant message (IM) 2074, a browser 2075, a camera 2076, an alarm 2077, contacts 2078, a voice dialer 2079, an email 2080, a calendar 2081, a media player 2082, an album 2083, a watch 2084, a healthcare function (e.g., to measure calories burned during exercise, or blood sugar levels), and an environment information (e.g., atmospheric pressure, humidity, temperature information, and the like).

According to an embodiment of the present disclosure, the application 2070 includes an application (e.g., an information exchange application) that supports the exchange of information between the electronic device 1801 and the external electronic device. The application associated with exchanging information may include, for example, a notification relay application for notifying an external electronic device of certain information or a device management application for managing an external electronic device.

For example, a notification relay application may include a function of transferring the notification information generated by other applications (e.g., an SMS/MMS application, an e-mail application, a healthcare application, an environmental information application, and the like) of the electronic device to the external electronic device. Further, the notification relay application may receive notification information from, for example, the external electronic device and provide the received notification information to the user.

For example, the device management application may manage (e.g., install, delete, or update) at least one function (e.g., turning on/off the external electronic device itself (or some elements thereof) or adjusting the brightness (or resolution) of a display) of the external electronic device communicating with the electronic device, applications operating in the external electronic device, or services (e.g., a telephone call service or a message service) provided from the external electronic device.

According to an embodiment of the present disclosure, the application 2070 includes an application (e.g., a health management application) specified according to an attribute (e.g., as an attribute of the electronic device, the type of electronic device is a mobile medical equipment) of the external electronic device. According to an embodiment of the present disclosure, the application 2070 includes an application received from the external electronic device (e.g., a server, an electronic device, and the like). According to an embodiment of the present disclosure, the application 2070 includes a preloaded application or a third party application downloaded from the server. The names of the elements of the program module 2010, according to the embodiment illustrated in FIG. 20, may vary according to the type of operating system.

According to the present disclosure, at least a part of the program module 2010 is implemented in software, firmware, hardware, or a combination of two or more thereof. At least a part of the program module 2010 is implemented (e.g., executed), for example, by a processor or application program. At least some of the program module 2010 includes, for example, a module, program, routine, sets of instructions, or process for performing one or more functions.

According to various embodiments of the present disclosure, a wireless charging device may include: a housing of a first surface; a housing having a second surface facing the first surface in an opposite direction; a coil disposed in parallel and in proximity to the first surface; a PBA disposed to at least partially overlap with upper and lower portions of the coil and disposed in parallel and in proximity to the second surface of the housing; and an air circulation generation member laminated with a specific interval between the coil and the PBA to emit heat generated in each of the coil and the PBA to the outside.

According to the various embodiments of the present disclosure, the coil and the air circulation generation member may be disposed to be separated with a first gap and in parallel to each other, the PBA and the air circulation generation member may be disposed to be separated by a second gap and in parallel to each other, and the first and second gaps may be utilized as an air ventilation passage.

According to the various embodiments of the present disclosure, a shield member may be further provided below the coil, and a heat radiation member may be further provided below the shield member to deliver heat generated in the coil to the housing.

According to the various embodiments of the present disclosure, the housing may have one or more entrance vent holes formed on one side and one or more exit vent holes formed on the other side in an opposite direction of the one side.

According to the various embodiments of the present disclosure, the housing may further include a bracket, and the bracket may support the coil and may play a role of a duct of the air circulation generation member.

According to the various embodiments of the present disclosure, a heat radiation member may be disposed on the bracket to deliver to the bracket the heat delivered from the coil.

According to the various embodiments of the present disclosure, a temperature sensor may be further provided to any one of the coil and the PBA.

According to the various embodiments of the present disclosure, the coil and the air circulation generation member may be disposed centrally in a laminated manner.

According to the various embodiments of the present disclosure, a housing may have a plurality of vent holes disposed generally to a lower outer surface.

According to the various embodiments of the present disclosure, heat generated in wireless charging can be decreased when high-power or quick wireless charging is performed.

Further, according to the various embodiments of the present disclosure, heat generated due to misalignment of a transmitter and a receiver can be decreased when wireless charging is performed in the transmitter and the receiver.

The term "module" used in the present document may represent, for example, a unit including a combination of one or two or more of hardware, software, or firmware. The "module" may be, for example, used interchangeably with the terms "unit," "logic," "logical block," "component," or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an ASIC chip, FPGAs and a programmable-logic device performing some operations known to the art or to be developed in the future.

At least a part of an apparatus (e.g., modules or functions thereof) or method (e.g., operations) according to various embodiments may be, for example, implemented as instructions stored in a computer-readable storage medium in a form of a programming module. In case that the instruction is executed by a processor (e.g., processor 1820), the processor may perform functions corresponding to the instructions. The computer-readable storage media may be the memory 1830, for instance.

The computer-readable recording medium may include a hard disk, a floppy disk, and a magnetic medium (e.g., a magnetic tape), an optical medium (e.g., a compact disc-ROM (CD-ROM) and a DVD), a magneto-optical medium (e.g., a floptical disk), and a hardware device (e.g., a ROM, a RAM, a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of various embodiments, and vice versa.

The module or programming module according to various embodiments may include at least one or more of the aforementioned constituent elements, or omit some of the aforementioned constituent elements, or further include additional other constituent elements. Operations carried out by the module, the programming module or the other constituent elements according to various embodiments may be executed in a sequential, parallel, repeated or heuristic method. Also, some operations may be executed in different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A system, comprising:
a wireless power transmission device; and
a wireless power reception device,
wherein the wireless power transmission device comprises:
a housing including an upper cover and a lower cover,
a transmission coil positioned between a supporter and the upper cover,
an air circulation member configured to generate air flow for removing heat generated by the wireless power transmission device to an outside of the housing, the air circulation member being disposed in proximity to the transmission coil, and a printed board assembly (PBA) comprising a control circuit electronically connected to the transmission coil and the air circulation member, wherein the wireless power reception device comprises:
a wireless power reception circuit comprising a reception coil,
a battery, and
one or more processors electronically connected with the wireless power reception circuit,
wherein the wireless power transmission device is configured to generate an electromagnetic field via the transmission coil for enabling the wireless power reception device, when disposed on the upper cover, to charge the battery based on the generated electromagnetic field,
wherein the wireless power reception device is configured to perform a wireless charging operation by wirelessly receiving the electromagnetic field generated from the wireless power transmission device via the reception coil and providing electric power, corresponding to the received electromagnetic field, to the battery,
wherein, while the wireless power transmission device generates the electromagnetic field via the transmission coil or while the wireless power reception device charges the battery based on the generated electromagnetic field, the wireless power transmission device activates the air circulation member to generate air flow,
wherein the wireless power reception device is further configured to transmit a first signal to the wireless power transmission device at a defined time of day via the reception coil during the wireless charging operation, and
wherein, in response to receiving the first signal while the air circulation member of the power transmission device is activated, the wireless power transmission device is further configured to adjust a driving speed of the air circulation member.

2. The system of claim 1,
wherein the wireless power reception device is further configured to transmit a second signal relating to a quick charging mode to the wireless power transmission device via the reception coil, and
wherein in response to receiving the second signal, the wireless power transmission device is further configured to:
generate the electromagnetic field via the transmission coil to perform the quick charging mode, and
while generating the electromagnetic field via the transmission coil to perform the quick charging mode, activate the air circulation member to generate air flow or increase the driving speed of the air circulation member.

3. The system of claim 1,
wherein the wireless power reception device is further configured to, while the wireless power reception device disposed on the wireless power transmission device charges the battery based on the generated electromagnetic field by the wireless power transmission device, transmit the first signal relating to night time in response to identifying night time, and
wherein, in response to receiving the first signal relating to night time, the wireless power transmission device is further configured to decrease the driving speed of the air circulation member.

4. The system of claim 1,
wherein the wireless power reception device is further configured to, while the wireless power reception device disposed on the wireless power transmission device charges the battery based on the generated electromagnetic field by the wireless power transmission device, transmit the first signal relating to day time in response to identifying day time, and
wherein, in response to receiving the first signal relating to day time, the wireless power transmission device is further configured to increase the driving speed of the air circulation member.

5. The system of claim 1,
wherein the wireless power reception device is further configured to generate, when charging of the battery reaches a set charging amount during quick charging mode, a third signal for changing to a basic charging mode, and
wherein, in response to receiving the third signal for changing to a basic charging mode, the wireless power transmission device is further configured to deactivate the air circulation member or decrease the driving speed of the air circulation member.

6. The system of claim 1,
wherein the wireless power reception device is further configured to transmit, when charging is complete, a charging complete signal to the wireless power transmission device, and
wherein, in response to receiving the charging complete signal, the wireless power transmission device is further configured to deactivate the air circulation member.

7. The system of claim 1,
wherein the wireless power transmission device further comprises a temperature sensor disposed between the upper cover and the lower cover, and
wherein the wireless power transmission device is further configured to activate the air circulation member when an output value of the temperature sensor exceeds a threshold.

8. A wireless charging method for a system, the system comprising a wireless power transmission device and a wireless power reception device, the method comprising:
generating, by the wireless power transmission device, an electromagnetic field via a transmission coil for enabling the wireless power reception device disposed on the wireless power transmission device to charge a battery of the wireless power reception device based on the generated electromagnetic field;
performing, by the wireless power reception device, a wireless charging operation by wirelessly receiving the electromagnetic field generated by the wireless power transmission device and providing electric power, corresponding to the received electromagnetic field, to the battery;
activating, while the wireless power transmission device generates the electromagnetic field via the transmission coil or while the wireless power reception device charges the battery based on the generated electromagnetic field by the wireless power transmission device, an air circulation member of the wireless power transmission device to generate air flow by the wireless power transmission device;
transmitting, by the wireless power reception device, a first signal to the wireless power transmission device at a defined time of day via a reception coil during the wireless charging operation; and adjusting, by the wireless power transmission device, a driving speed of the air circulation member in response to receiving the first signal while the air circulation member of the wireless power transmission device is activated.

9. The method of claim 8, wherein activating the air circulation member comprises:
transmitting a second signal relating to a quick charging mode to the wireless power transmission device via the reception coil by the wireless power reception device; and
in response to receiving the second signal, by the wireless power transmission device:
generating the electromagnetic field via the transmission coil to perform the quick charging mode, and
while generating the electromagnetic field via the transmission coil to perform the quick charging mode, activating the air circulation member to generate air flow or increase the driving speed of the air circulation member.

10. The method of claim 8, further comprising:
transmitting the first signal relating to night time in response to identifying night time by the wireless power reception device, while the wireless power reception device disposed on the wireless power transmission device charges the battery based on the generated electromagnetic field by the wireless power transmission device; and
decreasing the driving speed of the air circulation member by the wireless power transmission device, in response to receiving the first signal relating to night time.

11. The method of claim 8, further comprising:
transmitting the first signal relating to day time in response to identifying day time by the wireless power reception device, while the wireless power reception device disposed on the wireless power transmission device charges the battery based on the generated electromagnetic field by the wireless power transmission device; and
increasing the driving speed of the air circulation member by the wireless power transmission device, in response to receiving the first signal relating to day time.

12. The method of claim 8, further comprising:
when charging of the battery reaches a set charging amount during a quick charging mode, generating a third signal for changing to a basic charging mode by the wireless power reception device; and
in response to receiving the third signal for changing to the basic charging mode, deactivating the air circulation member by the wireless power transmission device.

13. The method of claim 8, further comprising:
when charging is complete, transmitting a charging complete signal to the wireless power transmission device by the wireless power reception device; and
in response to receiving the charging complete signal, deactivating the air circulation member by the wireless power transmission device.

14. The method of claim 8, further comprising:
detecting temperature using a temperature sensor of the wireless power transmission device; and
activating the air circulation member by the wireless power transmission device when the detected temperature exceeds a threshold.

15. A wireless power transmission device comprising:
a housing including an upper cover and a lower cover;
a transmission coil positioned between a supporter and the upper cover;
an air circulation member configured to generate air flow for removing heat generated by the wireless power transmission device to an outside of the housing, the air circulation member being disposed in proximity to the transmission coil; and
a printed board assembly (PBA) comprising a control circuit electronically connected to the transmission coil and the air circulation member,
wherein the wireless power transmission device is configured to:
detect a wireless power reception device on the upper cover,
generate an electromagnetic field via the transmission coil in response to detecting the wireless power reception device, the electromagnetic field enabling the wireless power reception device to charge a battery thereof based on the generated electromagnetic field,
while generating the electromagnetic field via the transmission coil, activate the air circulation member to generate air flow,
receive, from the wireless power reception device, while generating the electromagnetic field, a first signal relating to day time or night time, at a specific time of day via the transmission coil, and
adjust a driving speed of the air circulation member in response to receiving the first signal while the air circulation member is activated.

16. The wireless power transmission device of claim 15, wherein the first signal is received from the wireless power reception device via the transmission coil.

17. The wireless power transmission device of claim 15, wherein the wireless power transmission device is further configured, in response to receiving from the wireless power reception device a second signal relating to a quick charging mode, to:
generate the electromagnetic field via the transmission coil to perform the quick charging mode; and
while generating the electromagnetic field via the transmission coil to perform the quick charging mode, activate the air circulation member to generate air flow.

18. The wireless power transmission device of claim 17, wherein the wireless power transmission device is further configured to:
receive, from the wireless power reception device while generating the electromagnetic field, a signal for changing to a basic charging mode; and
deactivate the air circulation member in response to receiving the signal for changing to the basic charging mode.

19. The wireless power transmission device of claim 15, wherein the wireless power transmission device is further configured to decrease the driving speed of the air circulation member in response to the received first signal relating to night time.

20. The wireless power transmission device of claim 15, wherein the wireless power transmission device is further configured to increase the driving speed of the air circulation member in response to the received first signal relating to day time.

21. The wireless power transmission device of claim 15, further comprising a temperature sensor disposed between the upper cover and the lower cover, wherein the wireless power transmission device is further configured to activate the air circulation member in response to an output value of the temperature sensor exceeding a threshold.

22. A wireless power reception device comprising:

a wireless power reception circuit comprising a reception coil;

a battery; and one or more processors which are electronically connected with the wireless power reception circuit, wherein the wireless power reception circuit is configured to receive, via the reception coil, an electromagnetic field generated by a transmission coil of a wireless power transmission device, and wherein the wireless power reception device is configured to:

provide electric power, corresponding to the received electromagnetic field, to the battery, and transmit a signal to the wireless power transmission device at a defined time of day via the reception coil for adjusting a driving speed of an air circulation member included in the wireless power transmission device.

23. The wireless power reception device of claim 22, wherein the signal is transmitted to decrease the driving speed of the air circulation member included in the wireless power transmission device in response to identifying night time by the wireless power reception device, while the wireless power reception device disposed on the wireless power transmission device charges the battery based on the generated electromagnetic field by the wireless power transmission device.

24. The wireless power reception device of claim 22, wherein the signal is transmitted to increase the driving speed of the air circulation member included in the wireless power transmission device in response to identifying day time by the wireless power reception device, while the wireless power reception device disposed on the wireless power transmission device charges the battery based on the generated electromagnetic field by the wireless power transmission device.

* * * * *